United States Patent
Yamada et al.

(10) Patent No.: US 8,936,876 B2
(45) Date of Patent: Jan. 20, 2015

(54) CARBON MATERIAL FOR NONAQUEOUS SECONDARY BATTERY, NEGATIVE ELECTRODE USING CARBON MATERIAL AND NONAQUEOUS SECONDARY BATTERY

(71) Applicant: Mitsubishi Chemical Corporation, Chiyoda-ku (JP)

(72) Inventors: Shunsuke Yamada, Ibaraki (JP); Tooru Fuse, Ibaraki (JP); Nobuyuki Ishiwatari, Ibaraki (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 14/079,212

(22) Filed: Nov. 13, 2013

(65) Prior Publication Data

US 2014/0065479 A1    Mar. 6, 2014

Related U.S. Application Data

(63) Continuation of application No. PCT/JP2012/062227, filed on May 11, 2012.

(30) Foreign Application Priority Data

May 13, 2011    (JP) ................ 2011-108457

(51) Int. Cl.
  *H01M 8/04*    (2006.01)
  *H01M 4/36*    (2006.01)
  *H01M 4/587*    (2010.01)
  *C01B 31/02*   (2006.01)

(52) U.S. Cl.
  CPC .............. *H01M 4/366* (2013.01); *H01M 4/587* (2013.01); *C01B 31/02* (2013.01); *C01P 2002/82* (2013.01); *C01P 2002/85* (2013.01)
  USPC ................................... 429/231.8; 429/231.95

(58) Field of Classification Search
  USPC ............... 429/231.95, 231.8, 211; 252/182.1; 423/445 R
  See application file for complete search history.

(56) References Cited

U.S. PATENT DOCUMENTS

| | | | |
|---|---|---|---|
| 5,326,658 | A | 7/1994 | Takahashi et al. |
| 5,340,670 | A | 8/1994 | Takami et al. |
| 5,888,671 | A | 3/1999 | Yamasaki et al. |
| 6,632,569 | B1 | 10/2003 | Kameda et al. |
| 2002/0015888 | A1 | 2/2002 | Omaru et al. |
| 2006/0251955 | A1* | 11/2006 | Yata et al. .............. 429/50 |
| 2009/0242849 | A1 | 10/2009 | Sudoh et al. |
| 2010/0221543 | A1 | 9/2010 | Sudoh et al. |
| 2012/0070733 | A1 | 3/2012 | Yamada et al. |

FOREIGN PATENT DOCUMENTS

| | | |
|---|---|---|
| JP | 6-168725 | 6/1994 |
| JP | 6-187988 | 7/1994 |
| JP | 09-213328 | 8/1997 |
| JP | 9-320596 | 12/1997 |
| JP | 10-079252 | 3/1998 |
| JP | 2001-332263 | 11/2001 |
| JP | 2003-272630 | 9/2003 |
| JP | 3534391 | 3/2004 |
| JP | 2004-311058 | 11/2004 |
| JP | 2007-153661 | 6/2007 |
| JP | 2008-270086 | 11/2008 |
| JP | 2009-117334 | 5/2009 |
| JP | 2010-219036 | 9/2010 |

OTHER PUBLICATIONS

International Search Report issued Jul. 3, 2012 in PCT/JP2012/062227 filed May 11, 2012.

* cited by examiner

*Primary Examiner* — Mark F Huff
*Assistant Examiner* — Monique Wills
(74) *Attorney, Agent, or Firm* — Oblon, Spivak, McClelland, Maier & Neustadt, L.L.P.

(57) ABSTRACT

This invention aims to provide a carbon material for a non-aqueous secondary battery having a high capacity and excellent charging/discharging load characteristics, which is used as a negative electrode material for a nonaqueous secondary battery. This invention relates to a carbon material for a non-aqueous secondary battery, which has a specific (1) Raman R value, (2) N atom concentration/C atom concentration ratio, and (3) S atom concentration/C atom concentration ratio.

11 Claims, No Drawings

CARBON MATERIAL FOR NONAQUEOUS SECONDARY BATTERY, NEGATIVE ELECTRODE USING CARBON MATERIAL AND NONAQUEOUS SECONDARY BATTERY

TECHNICAL FIELD

This invention relates to a carbon material for a nonaqueous secondary battery used for a nonaqueous secondary battery, a negative electrode formed using the carbon material, and a nonaqueous secondary battery having the negative electrode.

BACKGROUND ART

Recently, as electronic apparatuses have been miniaturized, demands for high-capacity secondary batteries have been increased. In particular, lithium ion secondary batteries, which have a higher energy density and better large-current charge/discharge characteristics than those of nickel-cadmium batteries and nickel-hydrogen batteries, are attracting attention. Although studies to increase the capacity of a lithium ion secondary battery have been conventionally widely carried out, it has been required that a lithium ion secondary battery has further improved capacity, large-current charge/discharge characteristics, high-temperature preservation property and high cycle characteristics, due to the increasing demand for a lithium ion secondary battery having a better performance.

A graphite material and amorphous carbon are often used as a carbon material for a lithium ion secondary battery, in view of the cost and the durability. However, since the Raman value of an amorphous carbon material is large, there have been problems in that the reversible capacity is small in the range of a practically applicable material and a high capacity cannot be obtained due to the difficulty in increasing the density of an active material layer. On the other hand, a graphite material can achieve a capacity close to 372 mAh/g, which is the theoretical capacity of lithium absorption, and is preferable as an active material. However, when the density of an active material layer including a negative electrode material is increased for increasing the capacity, there have been problems of the increase in the charging/discharging irreversible capacity, the decrease in the large-current charge/discharge characteristics and the decrease in the cycle performance, due to the breakage and the deformation of the material.

In order to solve the above problems, for example, Patent Document 1 discloses that: a nonaqueous solvent secondary battery excellent in the filling property of the carbon material, in the capacity and in the large-current charge/discharge characteristics is obtained; by using spheroidized graphite obtained by a mechanical energy treatment of scale-like graphite carbon particles; and by using a carbon material having a multilayer structure, which is obtained by mixing the obtained spheroidized graphite and an organic compound and then carbonizing the organic compound.

Patent Document 2 discloses that: it is possible to obtain a nonaqueous solvent secondary battery, in which the discharging capacity is high, the charging/discharging irreversible capacity in the initial cycle is kept low and the safety to an electrolytic solution is high; by using a carbon material having a multilayer structure, in which a carbide of an organic substance is adhered to the surface of a graphite carbonaceous substance, and in which the amount of the carbide of the organic substance is adjusted to 12 parts by weight or less and 0.1 parts by weight or more as the remaining carbon amount relative to 100 parts by weight of the graphite carbonaceous substance.

Further, Patent Document 3 discloses that: a nonaqueous solvent secondary battery having a low charging/discharging irreversible capacity in the initial cycle and excellent large-current charge/discharge characteristics is obtained; by using a carbon material having a multilayer structure, in which a carbide derived from a nitrogen-containing resin compound is adhered to the surface of graphite particles in which flat particles are gathered or bound in a state in that the oriented faces are not parallel to each other; and by introducing a certain amount of nitrogen atom on the surface of the carbon material having a multilayer structure.

On the other hand, Patent Document 4 discloses that: a nonaqueous solvent secondary battery having a low charging/discharging irreversible capacity in the initial cycle and excellent high-temperature preservation property is obtained; by letting spheroidized graphite obtained by a mechanical energy treatment of scale-like graphite carbon particles go through a contact treatment with at least sulfuric acid and hydrochloric acid; and by introducing a functional group including an element selected from sulfur and chlorine to the surface of the carbonaceous particles.

PRIOR ART DOCUMENT

Patent Document

Patent Document 1: Japanese Patent No. 3534391 publication
Patent Document 2: Japanese Patent No. 3712288 publication
Patent Document 3: JP-A-2009-117334 publication
Patent Document 4: JP-A-2010-219036 publication

SUMMARY OF THE INVENTION

Problems that the Invention is to Solve

According to the study by the prevent inventors, however, with the technique described in Patent Document 1, the amount of internal air pores is high and they are soft due to the folded structure of scale-like graphite. Accordingly, there have been problems in that the graphite particles are easily deformed when the density of the negative electrode active material layer is increased, and the large-current charge/discharge characteristics and the cycle performance deteriorate remarkably with graphite particles in which scale-like graphite is simply spheroidized.

With the technique described in Patent Document 2, the decrease in the specific surface area can be prevented by adjusting the amorphous carbonized substance amount of the organic substance adhered to the graphite carbonaceous substance, and certain improvement of the large-current charge/discharge characteristics has been confirmed. However, because there is no specific limitation to the amorphous carbonized substance of the organic substance, the negative electrode resistance cannot be decreased effectively, and it can be hardly considered that the large-current charge/discharge characteristics that are recently required are sufficiently satisfied.

In the technique described in Patent Document 3, only the nitrogen element amount is defined regarding the amorphous carbonized substance of the organic substance adhered to the graphite carbonaceous substance. Further, the effect to control the charging/discharging irreversible capacity in the initial cycle and the effect on the large-current charge/discharge characteristics were not sufficient.

Further, in the technique described in Patent Document 4, graphite particles obtained by spheroidizing scale-like graphite and having soft internal air pores in a high amount, which are easily deformed when the density of the negative electrode active material layer is increased, are used; and only the sulfur element amount and the chlorine element amount are defined regarding the amounts of the functional groups introduced to the surface of the carbonaceous particles. Accordingly, the effect to control the charging/discharging irreversible capacity in the initial cycle and the effect on the large-current charge/discharge characteristics were not sufficient.

Accordingly, this invention was made in view of the above background techniques; and an object thereof is to provide a negative electrode material for producing a lithium ion secondary battery, in which the charging/discharging irreversible capacity in the initial cycle is sufficiently small even the density of the negative electrode active material layer is increased, and which has high input-output characteristics and high cycle performance; and as a result provide a nonaqueous secondary battery having a high capacity, high input-output characteristics and high cycle performance.

Means for Solving the Problems

The present inventors conducted extensive studies to solve the above problems; as a result found that it is possible to obtain a nonaqueous secondary battery, in which the charging/discharging irreversible capacity in the initial cycle is sufficiently small, and which has large-current charge/discharge characteristics and high cycle performance, by using a carbon material containing certain amounts of nitrogen element and sulfur element as the negative electrode material; and thus completed this invention.

That is, the gist of this invention resides in the followings.

<1>

A carbon material for a nonaqueous secondary battery, which satisfies the following conditions (1) to (3):

(1) the Raman R value represented by the following formula 1 is 0.01 or more and 1 or less, Raman R value=Intensity $I_B$ of peak $P_B$ around 1360 cm$^{-1}$ in Raman spectrum analysis/Intensity $I_A$ of peak $P_A$ around 1580 cm$^{-1}$ in Raman spectrum analysis; Formula 1:

(2) the N/C represented by the following formula 2 is 0.05% or more and 2% or less, N/C (%)=[N atom concentration calculated based on peak area of N1s spectrum in X-ray photoelectron spectroscopy analysis/C atom concentration calculated based on peak area of C1s spectrum in X-ray photoelectron spectroscopy analysis]×100; Formula 2:

and (3) the S/C represented by the following formula 3 is 0.05% or more and 2% or less, S/C (%)=[S atom concentration calculated based on peak area of S2s spectrum in X-ray photoelectron spectroscopy analysis/C atom concentration calculated based on peak area of C1s spectrum in X-ray photoelectron spectroscopy analysis]×100. Formula 3:

<2>

The carbon material for a nonaqueous secondary battery as described in the item <1> above, wherein graphite particles are a carbon material that has a multilayer structure and is covered with amorphous carbon.

<3>

The carbon material for a nonaqueous secondary battery as described in the item <2> above, wherein the graphite particles include natural graphite.

<4>

The carbon material for a nonaqueous secondary battery as described in the item <2> or <3> above, wherein the Raman R value represented by the following formula 1 of the graphite particles is 0.05 or more and 1 or less, Raman R value=Intensity $I_B$ of peak $P_B$ around 1360 cm$^{-1}$ in Raman spectrum analysis/Intensity $I_A$ of peak $P_A$ around 1580 cm$^{-1}$ in Raman spectrum analysis Formula 1:

<5>

The carbon material for a nonaqueous secondary battery as described in any one of the items <2> to <4> above, wherein the tap density of the graphite particles is 0.7 g/cm$^3$ or more and 1.20 g/cm$^3$ or less.

<6>

A method for producing complex graphite particles (C) for a nonaqueous secondary battery, which comprises: mixing graphite particles (A) and an organic compound (B); and carbonizing the organic compound (B), wherein the amount of a quinoline insoluble component in the organic compound (B) is 1% by mass or more.

<7>

The method for producing complex graphite particles (C) for a nonaqueous secondary battery as described in the item <6> above, wherein the amount of a toluene insoluble component in the organic compound (B) is 16% by mass or more.

<8>

The method for producing complex graphite particles (C) for a nonaqueous secondary battery as described in the item <6> or <7> above, wherein a carbon powder obtained by calcining and carbonizing the organic compound (B) at 1000° C. and then pulverizing for 30 seconds in the atmosphere with a rapid oscillation-type sample mill, satisfies the following conditions (I) to (IV), (I) the N/C represented by the following formula 2 is 0.27% or more and 2% or less, N/C (%)=[N atom concentration calculated based on peak area of N1s spectrum in X-ray photoelectron spectroscopy analysis/C atom concentration calculated based on peak area of C1s spectrum in X-ray photoelectron spectroscopy analysis]×100, Formula 2:

(II) the S/C represented by the following formula 3 is 0.02% or more and 2% or less, S/C (%)=[S atom concentration calculated based on peak area of S2s spectrum in X-ray photoelectron spectroscopy analysis/C atom concentration calculated based on peak area of C1s spectrum in X-ray photoelectron spectroscopy analysis]×100, Formula 3:

(III) the spacing of the 002 plane (d002) by X-ray wide-angle diffraction is 0.345 nm or more and 0.36 nm or less, and (IV) the crystallite size Lc (004) is 0.1 nm or more and 20 nm or less.

<9>

A carbon material for a nonaqueous secondary battery, which comprises the complex graphite particles (C) for a nonaqueous secondary battery obtained by the production method as described in any one of the items <6> to <8> above.

<10>

A negative electrode for a nonaqueous secondary battery, which comprises a current collector and an active material layer formed on the current collector, wherein the active material layer includes the carbon material for a nonaqueous secondary battery described in any one of the items <1> to <5> and <9> above.

<11>

A lithium ion secondary battery which comprises: a positive electrode and a negative electrode capable of occluding and releasing lithium ion; and an electrolyte, wherein the negative electrode is the negative electrode for a nonaqueous secondary battery as described in the item <10> above.

Effects of the Invention

With the carbon material for a nonaqueous secondary battery of this invention, a nonaqueous secondary battery having a high capacity, high input-output characteristics and high cycle performance can be provided, by using the carbon material as the negative electrode material for the nonaqueous secondary battery.

MODES FOR CARRYING OUT THE INVENTION

The contents of this invention are explained in detail below. In this regard, the explanations of the features of the invention described below are examples (representative examples) of the embodiments of this invention, and this invention is not limited by these embodiments as long as it does not go beyond its gist.

Furthermore, in this description, the "% by mass" and "% by weight", and the "parts by mass" and "parts by weight" are each synonyms.

<Carbon Material for Nonaqueous Secondary Battery>

The carbon material for a nonaqueous secondary battery of this invention has the following characteristics.

(1) Raman R Value

The Raman R value of the carbon material for a nonaqueous secondary battery is defined by measuring the intensity $I_A$ of the peak $P_A$ around 1580 $cm^{-1}$ and the intensity $I_B$ of the peak $P_B$ around 1360 $cm^{-1}$, and calculating the intensity ratio R ($R=I_B/I_A$). That is, the Raman value is represented by the following formula 1.

Raman $R$ value=Intensity $I_B$ of peak $P_B$ around 1360 $cm^{-1}$ in Raman spectrum analysis/Intensity $I_A$ of peak $P_A$ around 1580 $cm^{-1}$ in Raman spectrum analysis     Formula 1:

The Raman R value is 0.01 or more, preferably 0.05 or more, more preferably 0.1 or more and further preferably 0.15 or more. Further, the Raman R value is 1 or less, preferably 0.9 or less and more preferably 0.8 or less.

When the Raman R value is too large, the crystal on the particle surface falls into disorder, the reactivity with the electrolytic solution increases, and the efficiency tends to deteriorate. When the Raman R value is too small, the charging/discharging reactivity deteriorates, and there is a tendency towards the increased gas generation during the preservation at a high temperature or the deterioration of the large-current charge/discharge characteristics.

In this regard, in this invention, among the carbon materials having a Raman R value in the above range, a material in which graphite particles are covered with an amorphous carbon material is preferable. This is because the Li ion insertion/desorption at the particle interface is easy, and because, by appropriately hardening the particles and preventing the particles from excessively deforming at an electrode having a high density, a nonaqueous solvent secondary battery having a low charging/discharging irreversible capacity in the initial cycle and excellent large-current charge/discharge characteristics is obtained.

The Raman spectrum can be measured with a Raman spectrometer. Specifically, the sample is filled by letting the particles to be measured freely fall in the measurement cell, and the measurement is performed while the measurement cell is irradiated with an argon ion laser light and while the measurement cell is rotated in the plane perpendicular to this laser light.

Wavelength of argon ion laser light: 514.5 nm
Laser power on sample: 25 mW
Resolution: 4 $cm^{-1}$
Measurement range: 1100 $cm^{-1}$ to 1730 $cm^{-1}$
Measurement of peak intensity, measurement of peak half value width: Background processing, smoothing processing (convolution by simple average of 5 points)

(2) Surface Functional Group Amount (N/C)

The surface functional group amount (N/C) of the carbon material for a nonaqueous secondary battery is defined by the following formula 2.

N/C (%)=[N atom concentration calculated based on peak area of N1s spectrum in X-ray photoelectron spectroscopy analysis/C atom concentration calculated based on peak area of C1s spectrum in X-ray photoelectron spectroscopy analysis]×100,     Formula 2:

In this regard, the N/C is 0.05% or more, preferably 0.1% or more, more preferably 0.3% or more and further preferably 0.4% or more. Further, the N/C is 2% or less, preferably 1.7% or less and more preferably 1.5% or less. When this surface functional group amount N/C is too small, the desolvation reactivity of the Li ion and the electrolytic solution solvent on the surface of the negative electrode active material deteriorates, and the large-current charge/discharge characteristics tend to deteriorate. When the N/C is too large, the reactivity with the electrolytic solution increases and the charging/discharging efficiency tends to deteriorate.

The surface functional group amount N/C in this invention can be measured using X-ray photoelectron spectroscopy (XPS).

As the X-ray photoelectron spectroscopy measurement, an X-ray photoelectron spectrometer is used, the object to be measured is placed on a sample stage with the surface flat, and the spectra of C1s (280 to 300 eV) and N1s (390 to 410 eV) are measured using Kα-ray of aluminum as the X-ray source and by the multiplex measurement. After charge correction by setting the obtained peak top of C1s at 284.3 eV, the peak areas of the spectra of C1s and N1s are determined and then multiplied by an apparatus sensitivity coefficient to calculate the surface atom concentrations of C and N, respectively. The N/C is calculated by the formula 2 using the obtained surface atom concentrations of N and C.

(3) Surface Functional Group Amount (S/C)

The surface functional group amount (S/C) of the carbon material for a nonaqueous secondary battery is defined by the following formula 3.

S/C (%)=[S atom concentration calculated based on peak area of S2s spectrum in X-ray photoelectron spectroscopy analysis/C atom concentration calculated based on peak area of C1s spectrum in X-ray photoelectron spectroscopy analysis]×100,     Formula 3:

In this regard, the S/C is 0.05% or more, preferably 0.1% or more, more preferably 0.3% or more and further preferably 0.4% or more. Further, the S/C is 2% or less, preferably 1.7% or less and more preferably 1.5% or less. When this surface functional group amount S/C is too small, the desolvation reactivity of the Li ion and the electrolytic solution solvent on the surface of the negative electrode active material deteriorates, and the large-current charge/discharge characteristics tend to deteriorate. When the S/C is too large, the reactivity with the electrolytic solution increases and the charging/discharging efficiency tends to deteriorate.

The surface functional group amount S/C in this invention can be measured using X-ray photoelectron spectroscopy (XPS).

As the X-ray photoelectron spectroscopy measurement, an X-ray photoelectron spectrometer is used, the object to be measured is placed on a sample stage with the surface flat, and the spectra of C1s (280 to 300 eV) and S2p (160 to 175 eV) are measured using Kα-ray of aluminum as the X-ray source and by the multiplex measurement. After charge correction by setting the obtained peak top of C1s at 284.3 eV, the peak areas of the spectra of C1s and S2p are determined and then multiplied by an apparatus sensitivity coefficient to calculate the surface atom concentrations of C and S, respectively. The S/C is calculated by the formula 3 using the obtained surface atom concentrations of S and C.

(4) Surface Functional Group Amount (O/C)

The surface functional group amount (O/C) of the carbon material for a nonaqueous secondary battery is defined by the following formula 4.

O/C (%)=[O atom concentration calculated based on peak area of O1s spectrum in X-ray photoelectron spectroscopy (XPS) analysis/C atom concentration calculated based on peak area of C1s spectrum in XPS analysis]×100    Formula 4:

In this regard, the O/C is generally 0.1% or more, preferably 0.3% or more and more preferably 0.5% or more. Further, the O/C is generally 10% or less, preferably 5% or less and more preferably 3% or less. When this surface functional group amount O/C is too small, the desolvation reactivity of the Li ion and the electrolytic solution solvent on the surface of the negative electrode active material deteriorates, and the large-current charge/discharge characteristics tend to deteriorate. When the O/C is too large, the reactivity with the electrolytic solution increases and the charging/discharging efficiency tends to deteriorate.

The surface functional group amount O/C in this invention can be measured using X-ray photoelectron spectroscopy (XPS).

As the X-ray photoelectron spectroscopy measurement, an X-ray photoelectron spectrometer is used, the object to be measured is placed on a sample stage with the surface flat, and the spectra of C1s (280 to 300 eV) and O1s (525 to 545 eV) are measured using Kα-ray of aluminum as the X-ray source and by the multiplex measurement. After charge correction by setting the obtained peak top of C1s at 284.3 eV, the peak areas of the spectra of C1s and O1s are determined and then multiplied by an apparatus sensitivity coefficient to calculate the surface atom concentrations of C and O, respectively. The O/C is calculated by the formula 4 using the obtained surface atom concentrations of O and C.

(5) Sum of S/C and N/C

The sum of the S/C and the N/C is generally 0.3% or more, preferably 0.32% or more and more preferably 0.33% or more, and the sum is generally 4% or less, preferably 3.8% or less and more preferably 3.7% or less. When the sum of the S/C and the N/C is too small, the desolvation reactivity of the Li ion and the electrolytic solution solvent on the surface of the negative electrode active material deteriorates, and the large-current charge/discharge characteristics tend to deteriorate. When the sum of the S/C and the N/C is too large, the reactivity with the electrolytic solution increases and the charging/discharging efficiency tends to deteriorate.

(6) Surface Functional Group Amount (N/O)

The surface functional group amount (N/O) of the carbon material for a nonaqueous secondary battery is defined by the following formula 5.

N/O (%)=[N atom concentration calculated based on peak area of N1s spectrum in X-ray photoelectron spectroscopy (XPS) analysis/O atom concentration calculated based on peak area of O1s spectrum in XPS analysis]×100    Formula 5:

In this regard, the N/O is generally 30% or more, preferably 40% or more and more preferably 50% or more. Further, the N/O is generally 80% or less, preferably 70% or less and more preferably 60% or less. When the N/O is too small, the desolvation reactivity of the Li ion and the electrolytic solution solvent on the surface of the negative electrode active material deteriorates, and the large-current charge/discharge characteristics tend to deteriorate. When the N/O is too large, the reactivity with the electrolytic solution increases and the charging/discharging efficiency tends to deteriorate.

The surface functional group amount N/O in this invention can be measured using X-ray photoelectron spectroscopy (XPS).

As the X-ray photoelectron spectroscopy measurement, an X-ray photoelectron spectrometer is used, the object to be measured is placed on a sample stage with the surface flat, and the spectra of N1s (390 to 410 eV) and O1s (525 to 545 eV) are measured using Kα-ray of aluminum as the X-ray source and by the multiplex measurement. After charge correction by setting the obtained peak top of C1s (280 to 300 eV) at 284.3 eV, the peak areas of the spectra of N1s and O1s are determined and then multiplied by an apparatus sensitivity coefficient to calculate the surface atom concentrations of N and O, respectively. The N/O is calculated by the formula 5 using the obtained surface atom concentrations of N and O.

(7) Surface Functional Group Amount (S/O)

The surface functional group amount (S/O) of the carbon material for a nonaqueous secondary battery is defined by the following formula 6.

S/O (%)=[S atom concentration calculated based on peak area of S2s spectrum in X-ray photoelectron spectroscopy (XPS) analysis/O atom concentration calculated based on peak area of O1s spectrum in XPS analysis]×100    Formula 6:

In this regard, the S/O is generally 5% or more, preferably 10% or more and more preferably 20% or more. Further, the S/O is generally 50% or less, preferably 40% or less and more preferably 30% or less. When the S/O is too small, the desolvation reactivity of the Li ion and the electrolytic solution solvent on the surface of the negative electrode active material deteriorates, and the large-current charge/discharge characteristics tend to deteriorate. When the S/O is too large, the reactivity with the electrolytic solution increases and the charging/discharging efficiency tends to deteriorate.

The surface functional group amount S/O in this invention can be measured using X-ray photoelectron spectroscopy (XPS).

As the X-ray photoelectron spectroscopy measurement, an X-ray photoelectron spectrometer is used, the object to be measured is placed on a sample stage with the surface flat, and the spectra of S2p (160 to 175 eV) and O1s (525 to 545 eV) are measured using Kα-ray of aluminum as the X-ray source and by the multiplex measurement. After charge correction by setting the obtained peak top of C1s (280 to 300 eV) at 284.3 eV, the peak areas of the spectra of C1s and O1s are determined and then multiplied by an apparatus sensitivity coefficient to calculate the surface atom concentrations of S and O, respectively. The S/O is calculated by the formula 6 using the obtained surface atom concentrations of S and O.

(8) Spacing of 002 Plane (d002) and Crystallite Size (Lc (004))

The spacing of the 002 plane (d002) by X-ray wide-angle diffraction of the carbon material for a nonaqueous secondary battery is generally 0.337 nm or less, and the crystallite size (Lc (004)) is generally 90 nm or more. The spacing of the 002 plane (d002) by X-ray wide-angle diffraction and the crystallite size (Lc (004)) within the above ranges mean that the crystallinity of the most part of the particles of the carbon material for a nonaqueous secondary battery except for the surface is high, and that it is a carbon material that provides an electrode having a high capacity without causing the decrease in the capacity due to the large irreversible capacity observed in amorphous carbon materials.

(9) Tap Density

The tap density of the carbon material for a nonaqueous secondary battery is generally 0.7 g/cm$^3$ or more and preferably 1.3 g/cm$^3$ or less.

When the tap density is too low, sufficient continuous pores are not secured particularly in an electrode rolled into a high density, the mobility of the Li ion in the electrolytic solution supported by the pores deteriorates, and thus the large-current charge/discharge characteristics tend to deteriorate. When the tap density is too high, the carbon density in the particles increases, the rolling property is not enough, and thus the formation of a negative electrode sheet with a high density tends to be difficult.

In this invention, as for the tap density, using a powder density meter, the object to be measured is dropped in a cylindrical tap cell having a diameter of 1.6 cm and a volume capacity of 20 cm$^3$ through a sieve having a sieve opening of 300 μm to fill up the cell, tapping with a stroke length of 10 mm is then performed 1000 times, and the density determined from the volume and the weight of the sample is defined as the tap density.

(10) Specific Surface Area by BET Method

The specific surface area by the BET method of the carbon material for a nonaqueous secondary battery is generally 0.5 m$^2$/g or more and preferably 1.0 m$^2$/g or more. Further, the specific surface area is generally 8 m$^2$/g or less and more preferably 7 m$^2$/g or less. When the specific surface area is too large, the reactivity with the electrolytic solution increases and there is a possibility that the charging/discharging efficiency deteriorates, while the charging/discharging reactivity deteriorates and there is a tendency towards the increased gas generation during the preservation at a high temperature or the deterioration of the large-current charge/discharge characteristics, when the specific surface area is too small.

Regarding the method for measuring the BET specific surface area, the specific surface area is measured using a specific surface area measuring apparatus according to a nitrogen gas adsorption flow process by a BET one-point method.

(11) Pore Volume

The pore volume of the carbon material for a nonaqueous secondary battery in the range of 10 nm to 100000 nm by a mercury intrusion method is generally 5 ml/g or less, preferably 3 ml/g or less and more preferably 2 ml/g or less, and is generally 0.01 ml/g or more, preferably 0.05 ml/g or more and more preferably 0.1 ml/g or more. The pore volume in the range of 250 to 2500 nm is generally 0.001 ml/g or more, preferably 0.002 ml/g or more and more preferably 0.005 ml/g or more, and is generally 1 ml/g or less, preferably 0.9 ml/g or less and more preferably 0.7 ml/g or less. When the pore amount is too high, the specific surface area due to the pores increases, the reaction with the electrolytic solution occurs excessively, and the irreversible capacity tends to increase; while the large-current charge/discharge characteristics tend to deteriorate when the pore amount is too low.

(12) Average Particle Diameter (d50)

The average particle diameter (d50) of the carbon material for a nonaqueous secondary battery is generally 40 μm or less, preferably 30 μm or less and more preferably 25 μm or less, and is generally 3 μm or more, preferably 4 μm or more and more preferably 5 μm or more. If the average particle diameter is too large, defects in the processes such as streaks are often developed when a polar plate is produced with exceeding the particle diameter range. If the particle diameter is smaller than the above range, the surface area becomes too large and the control over the activity with the electrolytic solution tends to be difficult.

Regarding the method for measuring the particle diameter, 0.01 g of a carbon material is suspended in 10 mL of a 0.2% by mass aqueous solution of polyoxyethylene sorbitan monolaurate as a surfactant, the suspension is introduced to a commercially available laser diffraction/scattering-type particle size distribution measurement apparatus and irradiated with an ultrasonic wave of 28 kHz at an output of 60 W for one minute, and the diameter measured as the volume-based median size in the measurement apparatus is defined as the d50 in this invention.

(13) Graphite Crystal Orientation Ratio (I(110)/I(004))

The peak intensity ratio R (=I(110)/I(004)) corresponding to the lattice planes (110) and (004) of the carbon material for a nonaqueous secondary battery, which are obtained by wide-angle X-ray diffraction measurement, is generally 0.5 or less, preferably 0.4 or less and more preferably 0.3 or less, and is generally 0.05 or more, preferably 0.1 or more and more preferably 0.15 or more. When the powder orientation ratio is lower than the above range, the expansion of the electrode during the battery charging becomes large, and the cycle performance tends to deteriorate due to the elimination of the active material and the like caused by the expansion/contraction during the cycle test. On the other hand, when the powder orientation ratio exceeds the above range, it is sometimes difficult to increase the filling density of the active material of the electrode by pressing.

(14) Average Degree of Circularity

The degree of circularity (=perimeter of a circle having the same area as the particle projected area/perimeter of the particle projected image) obtained by the following formula, which is measured with respect to the particles having particle diameters of 10 μm to 40 μm of the carbon material for a nonaqueous secondary battery, is generally 0.85 or more, preferably 0.9 or more and more preferably 0.93 or more. When the average degree of circularity is smaller than this range, the large-current charge/discharge characteristics tend to deteriorate.

<Production Method of Carbon Material for Nonaqueous Secondary Battery>

The method for producing the carbon material for a nonaqueous secondary battery is not particularly limited, as long as a carbon material for a nonaqueous secondary battery having a Raman R value of 0.01 or more and 1 or less, N/C of 0.05% or more and 2% or less and S/C of 0.05% or more and 2% or less is produced.

In this regard, a production method of covering graphite particles with an amorphous carbon material by mixing an organic compound under a specific condition to the graphite particles and by sintering them under a certain temperature condition is described below as a preferable embodiment; however, the carbon material for a nonaqueous secondary battery is not limited by this method.

<Graphite Particles>

Graphite particles are the main raw material for producing the carbon material for a nonaqueous secondary battery.

Physical Properties of Graphite Particles

The graphite particles in this invention are preferable those showing the following physical properties. In this regard, although the measurement methods in this invention are not particularly limited, but the methods are in accordance with the measurement methods described in Examples unless the circumstances are exceptional.

(1) Surface Functional Group Amount (O/C) of Graphite Particles

The surface functional group amount (O/C) of the graphite particles is defined by the following formula 7.

O/C (%)=[O atom concentration calculated based on peak area of O1s spectrum in X-ray photoelectron spectroscopy (XPS) analysis/C atom concentration calculated based on peak area of C1s spectrum in XPS analysis]×100    Formula 7:

In this regard, the O/C is generally 1% or more and 4% or less, preferably 2% or more and 3.6% or less, and more preferably 2.6% or more and 3% or less. When the O/C is too small, the affinity with a water-soluble polymer (B) deteriorates, the interaction between the negative electrode surface and the coating material becomes weak, and the coating material tends to peel off. When the O/C is too large, the O/C is difficult to adjust, there are tendencies towards the necessity for a stronger and longer production process and the necessity for an increased number of the processes, and thus there are possibilities that the productivity deteriorates and the cost rises.

The surface functional group amount O/C in this invention can be measured using X-ray photoelectron spectroscopy (XPS).

As the X-ray photoelectron spectroscopy measurement, an X-ray photoelectron spectrometer is used, the object to be measured is placed on a sample stage with the surface flat, and the spectra of C1s (280 to 300 eV) and O1s (525 to 545 eV) are measured using Kα-ray of aluminum as the X-ray source and by the multiplex measurement. After charge correction by setting the obtained peak top of C1s at 284.3 eV, the peak areas of the spectra of C1s and O1s are determined and then multiplied by an apparatus sensitivity coefficient to calculate the surface atom concentrations of C and O, respectively. The O/C is calculated by the formula 7 using the obtained surface atom concentrations of O and C.

(2) Particle Diameter (d50) of Graphite Particles

Although the particle diameter of the graphite particles is not particularly limited, as the applicable range, the d50 is generally 50 μm or less, preferably 30 μm or less and more preferably 25 μm or less. The d50 is generally 1 μm or more, preferably 4 μm or more and more preferably 10 μm or more. If the particle diameter exceeds this range, defects in the processes such as streaks are often developed when a polar plate is produced. If the particle diameter is smaller than the above range, the surface area becomes too large and the control over the activity with the electrolytic solution becomes difficult.

(3) BET Specific Surface Area (SA) of Graphite Particles

The specific surface area measured by the BET method of the graphite particles is generally 4 $m^2/g$ or more and preferably 5 $m^2/g$ or more. Further, the specific surface area is generally 11 $m^2/g$ or less, preferably 9 $m^2/g$ or less and more preferably 8 $m^2/g$ or less. When the specific surface area is smaller than this range, there are fewer sites at which Li enters/leaves and the rapid charge/discharge characteristics-output characteristics deteriorate. On the other hand, when the specific surface area exceeds this range, the activity of the active material to the electrolytic solution becomes excessive, the initial irreversible capacity becomes large, and thus there is a possibility that a battery with a high capacity cannot be produced.

(4) X-Ray Structural Analysis (XRD) of Graphite Particles

The abundance ratio (3R/2H) of the hexagonal crystal to rhombohedral crystal, which is obtained by X-ray structural analysis (XRD) of the graphite particles, is preferably 0.2 or more. When the 3R/2H is smaller than this range, there is a possibility that the rapid charge/discharge characteristics deteriorate.

In this regard, regarding the measurement method for X-ray structural analysis (XRD), the carbon material is filled in a 0.2 mm sample plate while the orientation is prevented, and the measurement is conducted with an X-ray diffraction apparatus with CuKα-ray at an output of 30 kV and 200 mA. After the background is subtracted from both the obtained peaks of 3R(101) at around 43.4° and 2H(101) at around 44.5°, the intensity ratio 3R(101)/2H(101) can be calculated.

(5) Tap Density of Graphite Particles

The tap density of the graphite particles is generally 0.7 $g/cm^3$ or more and preferably 1 $g/cm^3$ or more. Further, the tap density is generally 1.20 $g/cm^3$ or less and preferably 1.1 $g/cm^3$ or less. When the tap density is too low, the rapid charge/discharge characteristics deteriorate; while the carbon density in the particles increases, the rolling property is not enough and the formation of a negative electrode sheet with a high density sometimes becomes difficult, when the tap density is too high.

In this invention, as for the tap density, using a powder density meter, the object to be measured is dropped in a cylindrical tap cell having a diameter of 1.6 cm and a volume capacity of 20 $cm^3$ through a sieve having a sieve opening of 300 μm to fill up the cell, tapping with a stroke length of 10 mm is then performed 1000 times, and the density determined from the volume and the weight of the sample is defined as the tap density.

(6) Raman Spectrum of Graphite Particles

The Raman R value of the graphite particles is defined by measuring the intensity $I_A$ of the peak $P_A$ around 1580 $cm^{-1}$ and the intensity $I_B$ of the peak $P_B$ around 1360 $cm^{-1}$, and calculating the intensity ratio R ($R=I_B/I_A$). The value is 0.05 or more, preferably 0.1 or more, more preferably 0.15 or more and further preferably 0.20 or more. Further, the value is 1 or less, preferably 0.9 or less and more preferably 0.8 or less. Furthermore, the value is generally 1 or less, preferably 0.4 or less and more preferably 0.3 or less. When the Raman R value is smaller than this range, the crystallinity on the particle surface becomes too large, the crystal is likely to be oriented in the parallel direction to the electrode plates when the density is increased, and there is a possibility that the load characteristics deteriorate. On the other hand, when the Raman R value exceeds this range, the crystal on the particle surface falls into disorder, the reactivity with the electrolytic solution increases, and there is a possibility of the deterioration of the charging/discharging efficiency and the increased gas generation.

The Raman spectrum can be measured with a Raman spectrometer. Specifically, the sample is filled by letting the particles to be measured freely fall in the measurement cell, and the measurement is performed while the measurement cell is irradiated with an argon ion laser light and while the measurement cell is rotated in the plane perpendicular to this laser light.

Wavelength of argon ion laser light: 514.5 nm
Laser power on sample: 25 mW
Resolution: 4 $cm^{-1}$
Measurement range: 1100 $cm^{-1}$ to 1730 $cm^{-1}$ Measurement of peak intensity, measurement of peak half value width: Background processing, smoothing processing (convolution by simple average of 5 points)

Production Method of Graphite Particles

The raw material of the graphite particles is not particularly limited as long as it is graphitized carbon particles; and natural graphite, artificial graphite, coke powder, needle coke powder and powder of a graphitized substance of a resin are mentioned. Graphite is preferable among them, because it is commercially available more easily, and because its effect to improve the charge/discharge characteristics at a high current density is remarkably larger than that of a case in which another negative electrode active material is used. Among them, natural graphite is preferable, and spherical graphite obtained by spheroidizing treatment is particularly preferable.

As the apparatus used for the spheroidizing treatment, for example, an apparatus for repeatedly applying to the particles a mechanical action, such as compression, friction and shear force including the interaction of particles mainly by an impact force, can be used. Specifically, an apparatus for conducting the surface treatment, which has a rotor having a large number of blades inside a casing, and which applies a mechanical action such as impact compression, friction and shear force to the carbon material introduced inside by the high-speed rotation of the rotor, is preferable. Further, an apparatus having a mechanism for repeatedly applying a mechanical action by circulating the carbon material is preferable. Preferred examples of the apparatus are Hybridization System (manufactured by Nara Machinery Co., Ltd.), Kryptron (manufactured by Earth Technica Co., Ltd.), CF Mill (manufactured by Ube Industries, Ltd.), Mechanofusion System (manufactured by Hosokawa Micron Corporation), and Theta Composer (manufactured by Tokuju Co., LTD.). Among them, Hybridization System manufactured by Nara Machinery Co., Ltd. is preferable.

The graphite particles; in which fine powders of mainly 5 µm or less produced by pulverization are adhered to matrix particles, in which scale-like natural graphite is folded through a spheronization process by the surface treatment above or the particles are spheroidized through the spheronization pulverization of the edge parts; are produced by conducting a spheronization treatment under a condition in which the surface functional group amount O/C value (%) of the graphite particles becomes generally 1% or more and 4% or less after the surface treatment. In this regard, it is preferable to conduct the treatment under an active atmosphere; so that the oxidation reaction of the graphite surface is advanced by energy of the mechanical treatment, and an acidic functional group can be introduced to the graphite surface. For example, when the treatment is carried out using the apparatus described above, the circumferential speed of the rolling rotor is preferably 30 to 100 m/second, more preferably 40 to 100 m/second and further preferably 50 to 100 m/second. Further, although the treatment is also possible by just passing the carbonaceous substance, it is preferable to conduct the treatment by circulating or accumulating the inside of the apparatus for 30 seconds or more, and it is more preferable to conduct the treatment by circulating or accumulating the inside of the apparatus for 1 minute or more.

<Organic Compound>

The organic compound preferably satisfies the conditions shown below. The organic compound in this invention is a raw material used for covering the graphite particles above with an amorphous carbon material or a graphite material.

Kind of Organic Compound

Regarding the kind of the organic compound, it is not particularly limited as long as it is carbonaceous and can be made into graphite or amorphous by calcination, and petroleum-type and coal-type fused polycyclic aromatic compounds including tar, soft pitch and hard pitch are preferably used. Specific examples thereof are coal-type heavy oils such as impregnating pitch, coal tar pitch and coal-liquefied oil, and petroleum-type heavy oils including straight-type heavy oils such as asphaltene, cracked heavy oils such as ethylene heavy end tar, and the like.

Physical Properties of Organic Compound

In this invention, the organic compound preferably has the following physical properties.

(1) Surface Functional Group Amounts (N/C, S/C and O/C) of Organic Compound

The surface functional group amounts (the N/C, the S/C and the O/C) of the organic compound preferably satisfy the following conditions, when a carbon powder, which is obtained by calcining and carbonizing the organic compound at 1000° C. and then pulverizing it for 30 seconds in the atmosphere with a rapid oscillation-type sample mill manufactured by CNT (TI-100 type), is analyzed.

(1-1) Surface Functional Group Amount (N/C)

The surface functional group amount (N/C) of the organic compound represented by the following formula 8 is generally 0.05% or more, preferably 0.1% or more, more preferably 0.27% or more and further preferably 0.40% or more, and is generally 6% or less, preferably 4% or less, more preferably 2% or less and further preferably 1% or less. When the N/C is too small, the desolvation reactivity of the Li ion and the electrolytic solution solvent on the surface of the negative electrode active material deteriorates, and there is a possibility that the large-current charge/discharge characteristics deteriorate. When the N/C is too large, the reactivity with the electrolytic solution increases and there is a possibility that the charging/discharging efficiency deteriorates.

In this regard, the N/C is defined by the following formula 8.

N/C (%)=[N atom concentration calculated based on peak area of N1s spectrum in X-ray photoelectron spectroscopy (XPS) analysis/C atom concentration calculated based on peak area of C1s spectrum in XPS analysis]×100   Formula 8:

The surface functional group amount (N/C) of the organic compound can be measured using X-ray photoelectron spectroscopy (XPS).

As the X-ray photoelectron spectroscopy measurement, an X-ray photoelectron spectrometer is used, the object to be measured is placed on a sample stage with the surface flat, and the spectra of C1s (280 to 300 eV) and N1s (390 to 410 eV) are measured using Kα-ray of aluminum as the X-ray source and by the multiplex measurement. After charge correction by setting the obtained peak top of C1s at 284.3 eV, the peak areas of the spectra of C1s and N1s are determined and then multiplied by an apparatus sensitivity coefficient to calculate the surface atom concentrations of C and N, respectively. The N/C value is calculated by the formula 8 using the obtained surface atom concentrations of N and C.

(1-2) Surface Functional Group Amount (S/C)

The surface functional group amount (S/C) of the organic compound represented by the following formula 9 is generally 0.01% or more, preferably 0.02% or more, more preferably 0.05% or more and further preferably 0.07% or more, and is generally 6% or less, preferably 4% or less, more preferably 2% or less and further preferably 1% or less. When the S/C is too small, the desolvation reactivity of the Li ion and the electrolytic solution solvent on the surface of the negative electrode active material deteriorates, and there is a possibility that the large-current charge/discharge characteristics deteriorate. When the S/C is too large, the reactivity with the electrolytic solution increases and the charging/discharging efficiency tends to deteriorate.

In this regard, the S/C is defined by the following formula 9.

S/C (%)=[S atom concentration calculated based on peak area of S2s spectrum in X-ray photoelectron spectroscopy (XPS) analysis/C atom concentration calculated based on peak area of C1s spectrum in XPS analysis]×100    Formula 9:

The surface functional group amount (S/C) of the organic compound can be measured using X-ray photoelectron spectroscopy (XPS).

As the X-ray photoelectron spectroscopy measurement, an X-ray photoelectron spectrometer is used, the object to be measured is placed on a sample stage with the surface flat, and the spectra of C1s (280 to 300 eV) and S2p (160 to 175 eV) are measured using Kα-ray of aluminum as the X-ray source and by the multiplex measurement. After charge correction by setting the obtained peak top of C1s at 284.3 eV, the peak areas of the spectra of C1s and S2p are determined and then multiplied by an apparatus sensitivity coefficient to calculate the surface atom concentrations of C and S, respectively. The S/C is calculated by the formula 9 using the obtained surface atom concentrations of S and C.

(1-3) Surface Functional Group Amount (O/C)

The surface functional group amount (O/C) of the organic compound is generally 0.1% or more, preferably 1% or more and more preferably 4.1% or more. Further, the O/C is generally 10% or less, preferably 8% or less and more preferably 5% or less. When the surface functional group amount O/C is too small, the desolvation reactivity of the Li ion and the electrolytic solution solvent on the surface of the negative electrode active material deteriorates, and there is a possibility that the large-current charge/discharge characteristics deteriorate. When the O/C is too large, the reactivity with the electrolytic solution increases and there is a possibility that the charging/discharging efficiency deteriorates.

In this regard, the O/C is defined by the following formula 10.

O/C (%)=[O atom concentration calculated based on peak area of O1s spectrum in X-ray photoelectron spectroscopy (XPS) analysis/C atom concentration calculated based on peak area of C1s spectrum in XPS analysis]×100    Formula 10:

The surface functional group amount (O/C) in this invention can be measured using X-ray photoelectron spectroscopy (XPS).

As the X-ray photoelectron spectroscopy measurement, an X-ray photoelectron spectrometer is used, the object to be measured is placed on a sample stage with the surface flat, and the spectra of C1s (280 to 300 eV) and O1s (525 to 545 eV) are measured using Kα-ray of aluminum as the X-ray source and by the multiplex measurement. After charge correction by setting the obtained peak top of C1s at 284.3 eV, the peak areas of the spectra of C1s and O1s are determined and then multiplied by an apparatus sensitivity coefficient to calculate the surface atom concentrations of C and O, respectively. The O/C is calculated by the formula 10 using the obtained surface atom concentrations of O and C.

(1-4) Sum of S/C and N/C

The sum of the S/C and the N/C in the organic compound is generally 0.3% or more, preferably 0.4% or more and more preferably 0.5% or more, and the sum is generally 10% or less, preferably 8% or less and more preferably 5% or less.

When the sum of the S/C and the N/C is too small, the desolvation reactivity of the Li ion and the electrolytic solution solvent on the surface of the negative electrode active material deteriorates, and there is a possibility that the large-current charge/discharge characteristics deteriorate. When the sum is too large, the reactivity with the electrolytic solution increases and the charging/discharging efficiency tends to deteriorate.

(2) X-Ray Parameter (d002 Value)

The spacing of the 002 plane (d002) by X-ray wide-angle diffraction of a carbon powder, which is obtained by graphite treatment of the organic compound, is preferably 0.3357 nm or more, more preferably 0.3358 nm or more and further preferably 0.3359 nm or more, and it is preferably 0.340 nm or less, more preferably 0.338 nm or less and further preferably 0.337 nm or less. When the d002 value is too large, it means that the crystallinity is low, and the charging/discharging capacity sometimes decreases because the carbon material for a nonaqueous secondary battery becomes particles with low crystallinity. When the d002 is too small, the charging/discharging reactivity deteriorates, and there is a possibility of the increased gas generation during the preservation at a high temperature or the deterioration of the large-current charge/discharge characteristics.

The spacing of the 002 plane (d002) by X-ray wide-angle diffraction of a carbon powder, which is obtained by calcining and carbonizing the organic compound at 1000° C. and then pulverizing for 30 seconds in the atmosphere with a rapid oscillation-type sample mill manufactured by CNT (TI-100 type), is preferably 0.34 nm or more, more preferably 0.342 nm or more, further preferably 0.345 nm or more and particularly preferably 0.346 nm or more, and the spacing is preferably 0.360 nm or less, more preferably 0.355 nm or less and further preferably 0.350 nm or less. When the d002 value is too large, it means that the crystallinity is low, and the charging/discharging capacity sometimes decreases because the carbon material for a nonaqueous secondary battery becomes particles with low crystallinity. When the d002 is too small, the charging/discharging reactivity deteriorates, and there is a possibility of the increased gas generation during the preservation at a high temperature or the deterioration of the large-current charge/discharge characteristics.

(3) Crystallite Size (Lc (004))

The crystallite size (Lc (004)) of the organic compound measured by X-ray diffraction by Gakushin-method of a carbon powder, which is obtained by graphite treatment of the organic compound, is preferably 10 nm or more, more preferably 30 nm or more and further preferably 50 nm or more, and is preferably 500 nm or less, more preferably 400 nm or less and further preferably 300 nm or less.

When the crystallite size exceeds this range, the charging/discharging capacity sometimes decreases because the carbon material for a nonaqueous secondary battery becomes particles with low crystallinity; while, when the crystallite size is smaller than this range, the charging/discharging reactivity deteriorates, and there is a possibility of the increased gas generation during the preservation at a high temperature or the deterioration of the large-current charge/discharge characteristics.

The crystallite size (Lc (004)) of the carbon material measured by X-ray diffraction by Gakushin-method of a carbon powder, which is obtained by calcining and carbonizing the organic compound at 1000° C. and then pulverizing for 30 seconds in the atmosphere with a rapid oscillation-type sample mill manufactured by CNT (TI-100 type), is preferably 0.1 nm or more, more preferably 1 nm or more and further preferably 3 nm or more, and is generally 100 nm or less, preferably 50 nm or less, more preferably 30 nm or less and further preferably 20 nm or less.

When the crystallite size exceeds this range, the charging/discharging capacity sometimes decreases because the carbon material for a nonaqueous secondary battery becomes particles with low crystallinity; while, when the crystallite size is smaller than this range, the charging/discharging reactivity deteriorates, and there is a possibility of the increased gas generation during the preservation at a high temperature or the deterioration of the large-current charge/discharge characteristics.

(4) Softening Point

The softening point of the organic compound is generally 400° C. or lower, preferably 200° C. or lower and more preferably 150° C. or lower. When the softening point is lower than this range, during the organic compound is mixed and kneaded with the graphite particles, it becomes difficult to mix them evenly, it is necessary to carry out the process at a high temperature, and thus the productivity is not always enough. The lower limit thereof is not particularly limited, but is generally 40° C. or higher.

(5) Quinoline Insoluble Component (QI) and Toluene Insoluble Component (TI)

The amount of the quinoline insoluble component of the organic compound is generally 0.6% by mass or more, preferably 1% by mass or more and more preferably 5% by mass or more. Further, the amount is generally 30% by mass or less, preferably 25% by mass or less and more preferably 20% by mass or less.

The amount of the toluene insoluble component of the organic compound is generally 16% by mass or more, preferably 20% by mass or more and more preferably 25% by mass or more. Further, the amount is generally 60% by mass or less, preferably 50% by mass or less and more preferably 40% by mass or less.

When the amounts of the quinoline insoluble component (QI) and the toluene insoluble component (TI) exceed these ranges, there is a possibility that the charging/discharging capacity decreases because the carbon material for a nonaqueous secondary battery becomes particles with low crystallinity; while, when the amounts are smaller than the ranges, the charging/discharging reactivity deteriorates, and there is a possibility of the increased gas generation during the preservation at a high temperature or the deterioration of the large-current charge/discharge characteristics.

<Production Method of Carbon Material for Nonaqueous Secondary Battery>

The method for producing the carbon material for a nonaqueous secondary battery is not particularly limited, as long as a carbon material for a nonaqueous secondary battery satisfying the following conditions (1) to (3) is produced.

(1) The Raman R value represented by the following formula 1 is 0.01 or more and 1 or less.

Raman $R$ value=Intensity $I_B$ of peak $P_B$ around 1360 cm$^{-1}$ in Raman spectrum analysis/Intensity $I_A$ of peak $P_A$ around 1580 cm$^{-1}$ in Raman spectrum analysis    Formula 1:

(2) The N/C represented by the following formula 2 is 0.05% or more and 2% or less.

N/C (%)=[N atom concentration calculated based on peak area of N1s spectrum in X-ray photoelectron spectroscopy (XPS) analysis/C atom concentration calculated based on peak area of C1s spectrum in XPS analysis]×100,    Formula 2:

(3) S/C represented by the following formula 3 is 0.05% or more and 2% or less.

S/C (%)=[S atom concentration calculated based on peak area of S2s spectrum in X-ray photoelectron spectroscopy (XPS) analysis/C atom concentration calculated based on peak area of C1s spectrum in XPS analysis]×100,    Formula 3:

A preferable embodiment is a production method using the graphite particles and the organic compound satisfying the conditions described above as raw materials.

More specifically, the carbon material for a nonaqueous secondary battery of this invention is produced by mixing the graphite particles and the organic compound satisfying the conditions described above, and carbonizing the organic compound in the mixture. The carbonizing treatment means an amorphous treatment or a graphite treatment. Such a carbon material, in which the graphite particles are covered with amorphous carbon or a graphite material, is sometimes called a carbon material having a multilayer structure in this description.

For example, when the graphite particles and the organic compound are mixed, it is possible to employ: (i) a method for obtaining a carbon material for a nonaqueous secondary battery by using the organic compound for obtaining a part covered with amorphous carbon or a part covered with a graphite material as it is, and heat-treating the mixture of the organic compound and the graphite particles; (ii) a method to previously prepare an amorphous carbon powder, in which the organic compound described above is partially carbonized, mix the powder with the graphite particles and heat-treat the mixture to obtain a complex; (iii) a method to previously prepare the amorphous carbon powder described above, mix the graphite particles, the amorphous carbon powder and the organic compound and heat-treat the mixture to obtain a complex; and the like. In this regard, in the second and third methods to previously prepare the amorphous carbon powder, it is preferable to use amorphous carbon having an average particle size that is one tenth or less of the average particle size of the graphite particles. Furthermore, it is also possible to employ a method to make the amorphous carbon prepared previously and the graphite particles to have a structure in which either thereof is mixed in the other, or a structure in which the both are electrostatically adhered, by applying mechanical energy such as pulverization.

It is preferable to obtain a carbon material for a nonaqueous secondary battery, in which the amorphous carbon is finally formed into a complex with the graphite particles; by obtaining a mixture of the graphite particles and the organic compound, or obtaining an intermediate substance by mixing a mixture of the graphite particles and the amorphous carbon and the organic compound and heating the mixture; and then carbonizing sintering and pulverizing.

The more detailed production process for obtaining the carbon material for a nonaqueous secondary battery of this invention can be divided in the following three processes.

First Process: A mixture is obtained by mixing the graphite particles and the organic compound, and if necessary a solvent, using various commercially available mixing machines, kneading machines and the like. The organic compound is mixed, after adjusting its charging amount, so that the ratio of the remaining carbon component derived from the organic compound in the carbon material for a nonaqueous secondary battery, which is obtained by carbonizing/graphitizing and is after a heat treatment, becomes generally 0.3% by mass or more, preferably 0.5% by mass or more and further preferably 1% by mass or more. Its upper limit is an amount, with which this ratio becomes generally 60% by mass or less, preferably 40% by mass or less, more preferably 30% by mass or less and further preferably 20% by mass or less. When the mixing amount of the organic compound is too high, the charging/discharging capacity decreases, the press load necessary for rolling the active material layer coated on the current collector into a high density becomes large, and as a result it becomes sometimes difficult to increase the capacity of the nonaqueous secondary battery. On the other hand, when the mixing amount of the organic compound is too low, the particles are broken or deformed when the active material layer coated on the current collector is rolled into a high density, and excellent large-current charge/discharge characteristics cannot be always achieved.

The amount of the carbon component derived from the organic compound in the carbon material for a nonaqueous secondary battery is controlled by the amount of the organic compound that is added in a stage before kneading. For example, when the remaining carbon ratio of the organic compound measured by the method described in JIS K2270 is p %, the organic compound should be added in an amount that is 100/p times of the desired amount.

For increasing the charging/discharging capacity and improving the press property, a graphitization catalyst may be added when the carbonaceous particles and the organic compound are mixed. As the graphitization catalyst, metals such as iron, nickel, titanium, silicon and boron and compounds such as carbides, oxides and nitrides thereof are mentioned. Among them, silicon, silicon compounds, iron and iron compounds are preferable, and silicon carbide is particularly preferable among silicon compounds and iron oxide is particularly preferable among iron compounds. When silicon or a silicon compound is used as the graphitization catalyst, silicon carbide produced by heating is all thermally decomposed at a temperature of 2800° C. or higher, graphite having excellent crystallinity is grown, and pores are formed between the graphite crystals when silicon volatilizes. Accordingly, the charge transfer reaction and diffusion of lithium ion in the particles are facilitated and the battery performance can be improved. Further, when iron or a compound thereof is used as the graphitization catalyst, graphite having excellent crystallinity is grown due to a mechanism of dissolution of carbon into the catalyst or deposition, and an effect similar to that of silicon can be exerted. The amount of such a graphitization catalyst is generally 30% by mass or less, preferably 20% by mass or less, further preferably 10% by mass or less and particularly preferably 5% by mass or less, relative to the carbonaceous primary particle as a raw material. When the amount of the graphitization catalyst is too high, the graphitization proceeds to an excessive degree, and there are sometimes problems in that the characteristics during the lithium ion secondary battery production, the liquid immersion property in particular, are not sufficient. At the same time, the intensity of the particles decreases, probably because pores are formed in the carbon material for a nonaqueous secondary battery. As a result, the surface is smoothed in the pressing process of the electrode plate preparation, and the movement of ions may be inhibited. On the other hand, when the amount of the graphitization catalyst is too low, the graphitization is not sufficient and there is a problem of the decrease in the charging/discharging capacity when a nonaqueous secondary battery is made. Further, a high pressure is required for the pressing process of the electrode plate preparation and it is sometimes difficult to increase the density. Furthermore, the intensity of the particles is too high, probably because an adequate amount of pores is not present in the carbon material for a nonaqueous secondary battery, a high pressure is required for the press molding of the active material layer coated on the current collector into a certain bulk density, and it is sometimes difficult to increase the density of the negative electrode active material layer.

The raw materials such as the graphite particles, the organic compound, a solvent if necessary, and the graphitization catalyst added if necessary are first kneaded under heating if necessary. After this, the mixture is in a state in which the liquid organic compound is adhered to the carbonaceous particles and the raw materials that do not melt at the kneading temperature. In this case, all the raw materials may be introduced to a kneader, and kneaded while the temperature is raised. Alternatively, the components other than the organic compound may be introduced to a kneader and heated in a mixing state, and the organic compound at a room temperature or in a vulcanized melting state may be introduced after the temperature has reached the kneading temperature.

The heating temperature is the softening point of the organic compound or higher, generally a temperature 10° C. or more higher than the softening point, and preferably a temperature 20° C. or more higher than the softening point, and the heating temperature is generally 450° C. or lower and preferably 250° C. or lower. When the heating temperature is too low, the viscosity of the organic compound becomes too high and there is a possibility that the mixing is difficult. When the heating temperature is too high, there is a possibility that the viscosity of the mixing system increases excessively due to the volatilization and the polycondensation of the organic compound.

The kneader is preferable of a type having a stirring blade, and a general stirring blade such as Z-type and masticator type can be used as the stirring blade. The amount of the raw materials introduced to the kneader is generally 10% by volume or more and preferably 15% by volume or more of the volume of the mixer, and the amount is 50% by volume or less and preferably 30% by volume or less. It is necessary that the kneading time is 5 minutes or longer, at longest, the kneading time is a time with which the viscosity changes largely due to the volatilization of the volatile components, and the kneading time is generally 30 to 120 minutes. The kneader is preferably preheated to the kneading temperature before kneading.

The kneaded material obtained may be directly subjected to a de-VM calcination process for removing and carbonizing volatile components (simply referred to as "VM" below), or may be subjected to a de-VM calcination process after forming if necessary so that the handling is easy.

The forming method is not particularly limited as long as the shape can be maintained, and extrusion molding, die molding, hydrostatic pressure molding and the like may be employed. Among them, in comparison with extrusion molding with which the particles are likely to be oriented in the formed material, die molding and hydrostatic pressure molding with which the orientation of the particles is kept random are preferable.

The forming temperature may be either of room temperature (cold) or under heating (hot, a temperature of the softening point of the binder or higher). When it is cold forming, it is preferable to previously crack the mixture, which has been cooled after kneading, into a maximum size of 1 mm or less, in order to improve the formability and achieve the evenness of the formed material. The form and the size of the formed material are not particularly limited, but the size is preferably about 150 cm or smaller as the maximum size, because, in hot forming, there is a problem in that it takes time to preheat evenly before forming when the formed material is too large.

Regarding the forming pressure, when the pressure is too high, the removal of the volatile components (de-VM)

through pores of the formed material is difficult, carbonaceous particles that are not perfect circles are oriented, and the pulverization in the later processes becomes sometimes difficult. Accordingly, the upper limit of the forming pressure is generally 3 tf/cm² (294 MPa) or less, preferably 1500 kgf/cm² (49 MPa) or less and more preferably 600 kgf/cm² (0.98 MPa) or less. The pressure at the lower limit is not particularly limited, but it is preferable to set the pressure so that the form of the formed material is maintained in the de-VM process.

Second Process: By heating the mixture or the formed material obtained, de-VM calcination is conducted to obtain an intermediate substance, from which the volatile components (VM) generating from the graphite particles, the solvent and the organic compound are removed. The de-VM calcination is carried out generally at 600° C. or higher and preferably at 650° C. or higher, and generally at 1300° C. or lower and preferably 1100° C. or lower, generally for 0.1 hours to 10 hours. In order to prevent the oxidation, the heating is generally carried out with a flow of an inert gas such as nitrogen or argon, or under a non-oxidizing atmosphere in which the space is filled with a granule carbon material such as breeze or packing coke.

The facility used for the de-VM calcination is not particularly limited, as long as it is a facility under a non-oxidizing atmosphere and can calcinate, for example, a reaction tank such a shuttle furnace, a tunnel furnace, a lead hammer furnace, rotary kiln and an autoclave, a coker (a tank for heat treatment of the coke production), an electric furnace or a gas furnace. The rate of temperature increase during heating is preferably low to remove the volatile components, and the temperature is generally raised from around 200° C. at which the volatilization of components with low boiling points starts, to around 700° C. at which only hydrogen generates, at 3 to 100° C./hr. During the treatment, stirring may be carried out if necessary.

The carbon material obtained by the de-VM calcination is heat (calcination)-treated at a high temperature. It is preferable to make the organic compound amorphous for the application in which the input-output characteristics are particularly important, and it is preferable to graphitize the organic compound for the application in which the characteristics for a high capacity are particularly important. The calcination temperature may be changed depending on the application, in which a further effect is required in addition to the effect of this invention.

The heating temperature to make the organic compound amorphous is generally 600° C. or higher, preferably 800° C. or higher, more preferably 900° C. or higher and further preferably 1000° C. or higher, and the heating temperature is generally 2600° C. or lower, preferably 2200° C. or lower, more preferably 1800° C. or lower and further preferably 1500° C. or lower.

Regarding the heating temperature for graphitizing the organic compound, the material is heated generally at 2600° C. or higher and preferably at 2800° C. or higher. Further, when the heating temperature is too high, the sublimation of the graphite becomes remarkable, and thus the heating temperature is preferably 3300° C. or lower. The heating time may be adjusted so that the organic compound and the carbonaceous particles become graphite, and it is generally 1 to 24 hours.

The atmosphere during the heat treatment is with a flow of an inert gas such as nitrogen or argon, or under a non-oxidizing atmosphere in which the space is filled with a granule carbon material such as breeze or packing, in order to prevent the oxidation. The facility used for the heat treatment is not particularly limited, as long as it is a facility meeting the above object, such as a reaction tank such a shuttle furnace, a tunnel furnace, a lead hammer furnace, rotary kiln and an autoclave, a coker (a tank for heat treatment of the coke production), an electric furnace or a gas furnace, and an Acheson furnace for an electrode material. The rate of temperature increase, the rate of temperature decrease, the heat treatment time and the like can be arbitrarily set in the acceptable range of the facility used.

Third Process: A powdering process such as pulverization, crushing, grinding or classifying process is conducted if necessary to the carbon material for a nonaqueous secondary battery above. The apparatus used for the pulverization is not particularly limited, but: a shearing mill, a jaw crusher, an impact crusher, a cone crusher and the like are mentioned as the crushing device; a roll crusher, a hammer mill and the like are mentioned as the intermediate crushing device; and a ball mill, a vibrational mill, a pin mill, a stirring mill, a jet mill and the like are mentioned as the finely pulverizing device.

The apparatus used for the classifying treatment is not particularly limited, but: a turning sieve, an agitating sieve, a rotary sieve, an oscillating sieve and the like can be used for dry screening; and a gravity classifier, an inertial classifier, and a centrifugal classifier (classifier, cyclone or the like) can be used for dry-airflow classification. Further, a wet screening, a mechanical wet classifier, a hydraulic classifier, a precipitation classifier, a centrifugal wet classifier and the like can be used.

<Mixing with Other Carbon Materials>

The carbon material for a nonaqueous secondary battery of this invention can be suitably used as a negative electrode material for a lithium ion secondary battery, by using a kind thereof alone, or by using two or more kinds thereof in any composition and combination. It is also possible to mix one kind or two or more kinds of the carbon material for a nonaqueous secondary battery of this invention with one kind or two or more kinds of other carbon materials, and use them as a negative electrode material for a nonaqueous secondary battery or preferably a lithium ion secondary battery.

When other carbon material is mixed to the carbon material for a nonaqueous secondary battery described above, the mixing ratio of the carbon material for a nonaqueous secondary battery relative to the total amount of the carbon material for a nonaqueous secondary battery and the other carbon material is in the range of generally 10% by weight or more, preferably 20% by weight or more, and generally 90% by weight or less and preferably 80% by weight or less. When the mixing ratio of the other carbon material is lower than the above range, the effect of addition is unlikely to appear. On the other hand, when the ratio exceeds the above range, the characteristics of the carbon material for a nonaqueous secondary are unlikely to appear.

As the other carbon material, a material selected from natural graphite, artificial graphite, amorphous covered graphite and amorphous carbon is used. A kind of such a material may be used alone, or two or more kinds may be used in any combination and composition.

As the natural graphite, scale-like graphite having an increased degree of purity or spheroidized graphite may be used. The volumetric basis average particle diameter of the natural graphite is in the range of generally 8 μm or more and preferably 12 μm or more, and generally 60 μm or less and preferably 40 μm or less. The BET specific surface area of the natural graphite is in the range of generally 3.5 m²/g or more and preferably 4.5 m²/g or more, and generally 8 m²/g or less and preferably 6 m²/g or less.

As the artificial graphite, particles obtained by graphitizing a carbon material and the like are mentioned, and for example, particles obtained by calcining and graphitizing single-kind graphite precursor particles and the like as a powder can be used.

As the amorphous covered graphite, for example, particles obtained by covering natural graphite or artificial graphite with an amorphous precursor and calcining them, and particles obtained by covering natural graphite or artificial graphite with an amorphous material by CVD can be used.

As the amorphous carbon, for example, particles obtained by calcining bulk mesophase or particles obtained by non-solubilizing and calcining an organic compound can be used.

The apparatus used for mixing the carbon material for a nonaqueous secondary battery and the other carbon material is not particularly limited, but for example: a cylindrical mixer, a twin cylindrical mixer, a double conical mixer, a regular cubic mixer and a spade mixer can be used as a rotary mixer; and a helical mixer, a ribbon mixer, a Muller-type mixer, a Helical Flight-type mixer, a Pugmill-type mixer and a fluidized mixer can be used as a fixed mixer.

<Negative Electrode for Nonaqueous Secondary Battery>

The negative electrode for a nonaqueous secondary battery of this invention (also called "electrode sheet" below) has a current collector and an active material layer formed on the current collector, and is characterized in that the active material layer includes at least the carbon material for a nonaqueous secondary battery of this invention. Further, a binder is preferably included.

The binder here means a binder added for purpose of binding the active material and keeping the active material layer on the current collector, when a negative electrode for a nonaqueous secondary battery is produced; which is different from the organic compound in this invention.

As the binder, a binder having an olefin unsaturated bond in the molecule is preferably used. Although its kind is not particularly limited, specific examples thereof are styrene-butadiene rubber, styrene/isoprene/styrene rubber, acrylonitrile-butadiene rubber, butadiene rubber, ethylene/propylene/diene copolymer and the like. By using such a binder having an olefin unsaturated bond, the swelling property of the active material layer to an electrolytic solution can be reduced. Among them, styrene-butadiene rubber is preferable in view of availability.

By using such a binder having an olefin unsaturated bond and the active material described above in combination, the intensity of the negative plate can be increased. When the intensity of the negative electrode is high, the deterioration of the negative electrode by charging/discharging is prevented, and the cycle life can be improved. Further, since the adhesion strength between the active material layer and the current collector is high in the negative electrode according to this invention, it is speculated that the problem, in that the active material layer peels off from the current collector when the battery is produced by winding the negative electrode, does not arise, even when the content of the binder in the active material layer is reduced.

As the binder having an olefin unsaturated bond in the molecule, a binder having a large molecular weight or a binder in which the ratio of the unsaturated bond is high is preferable. Specifically, in the case of a binder having a large molecular weight, a binder, which has a weight-average molecular weight within the range of generally 10000 or more and preferably 50000 or more, and generally 1000000 or less and preferably 300000 or less, is preferable. Further, in the case of a binder in which the ratio of the unsaturated bond is high, a binder, in which the molar number of the olefin unsaturated bond per 1 g of the whole binder is in the range of generally $2.5 \times 10^{-7}$ or more and preferably $8 \times 10^{-7}$ or more, and generally $1 \times 10^{-6}$ or less and preferably $5 \times 10^{-6}$ or less. It is only necessary that the binder satisfies at least either of the limitation to the molecular weight or the limitation to the ratio of the unsaturated bond, but a binder satisfying the both limitations at the same time is more preferable. When the molecular weight of the binder having an olefin unsaturated bond is too small, the mechanical strength deteriorates; while the flexibility deteriorates when the molecular weight is too large. Further, when the ratio of the olefin unsaturated bond in the binder is too low, the effect to improve the intensity deteriorates, while the flexibility deteriorates when the ratio is too high.

Further, the binder having an olefin unsaturated bond is preferably a binder having an unsaturation degree within the range of generally 15% or more, preferably 20% or more and more preferably 40% or more, and generally 90% or less and preferably 80% or less. In this regard, the unsaturation degree means the ratio (%) of the double bond to the repeating unit of the polymer.

In this invention, a binder having no olefin unsaturated bond can be also used with the binder having an olefin unsaturated bond described above, as far as the effect of this invention is not lost. The mixing ratio of the binder having no olefin unsaturated bond to the binder having an olefin unsaturated bond is within the range of generally 150% by weight or less and preferably 120% by weight or less.

By using a binder having no olefin unsaturated bond in combination, the coating property can be improved, but the intensity of the active material layer deteriorates when its mixing amount is too high.

Examples of the binder having no olefin unsaturated bond are: polysaccharide thickeners such as methyl cellulose, carboxymethyl cellulose, starch, carrageenan, pullulan, guar gum, xanthan gum; polyethers such as polyethylene oxide and polypropylene oxide; vinyl alcohols such as polyvinyl alcohol and polyvinyl butyral; polyacids such as polyacrylic acid and polymethacrylic acid; or metal salts of these polymers; fluorine-containing polymers such as polyvinylidene fluoride; alkane polymers such as polyethylene and polypropylene; and copolymers thereof.

The negative electrode of this invention is formed by dispersing the negative electrode material of this invention and the binder described above in a dispersion medium to form a slurry, and coating a current collector with this slurry. As the dispersion medium, organic solvents such as alcohols and water can be used. A conductive agent may be further added to this slurry if necessary. As the conductive agent, carbon black such as acetylene black, Ketjen black and Furnace black, Cu and Ni having an average particle diameter of 1 μm or less, fine powders made from such an alloy or the like are mentioned. The amount of the conductive agent is generally about 10% by weight or less relative to the negative electrode material of this invention.

Conventionally known current collectors can be used as the current collector coated with the slurry. Specifically, metal thin films such as rolled copper foil, electrolytic copper foil and stainless foil are mentioned. The thickness of the current collector is generally 4 μm or more and preferably 6 μm or more, and the thickness is generally 30 μm or less and preferably 20 μm or less.

This slurry was coated with a width of 5 cm on copper foil having a thickness of 18 μm as the current collector using a doctor blade, so that the negative electrode material was adhered in 14.5±0.3 mg/cm², and air drying was conducted at room temperature. After further drying at 110° C. for 30 minutes, roll pressing was conducted using a roller having a diameter of 20 cm, and the density of the active material layer was adjusted to 1.7±0.03 g/cm³ to obtain an electrode sheet.

After coating the slurry on the current collector, it is dried at a temperature of generally 60° C. or higher and preferably 80° C. or higher, and generally 200° C. or lower and preferably 195° C. or lower, with dry air or under inert atmosphere, and the active material layer is formed.

The thickness of the active material layer obtained by coating and drying the slurry is generally 5 μm or more, preferably 20 μm or more and more preferably 30 μm or more, and is generally 200 μm or less, preferably 100 μm or less and more preferably 75 μm or less. When the active material layer is too thin, the utility as a negative electrode is not sufficient in relation to the particle diameter of the active material. When the active material layer is too thick, sufficient Li absorption/discharging function to a current value with a high density is difficult to obtain.

The density of the carbon material for a nonaqueous secondary battery in the active material layer differs depending on the application, but is preferably 1.55 g/cm³ or more, more preferably 1.6 g/cm³ or more, further preferably 1.65 g/cm³ or more and particularly preferably 1.7 g/cm³ or more for the application in which the capacity is important. When the density is too low, the capacity of the battery per unit area is not always sufficient. Further, when the density is too high, the rate characteristics deteriorate, and thus the density is preferably 1.9 g/cm³ or less.

When a negative electrode for a nonaqueous secondary battery is produced using the carbon material for a nonaqueous secondary battery of this invention described above, the method or the selection of the other materials are not particularly limited. Further, when a lithium ion secondary battery is produced using this negative electrode, the selection of materials necessary for the battery structure, such as the positive electrode and the electrolytic solution constituting the lithium ion secondary battery, is not particularly limited, either. Although the details of the negative electrode for a lithium ion secondary battery and the lithium ion secondary battery using the negative electrode material of this invention are exemplified below, the usable materials, the production method and the like are not limited to the following specific examples.

<Nonaqueous Secondary Battery>

The basic structure of the nonaqueous secondary battery of this invention, the lithium ion secondary battery in particular, is similar to that of conventionally known lithium ion secondary batteries, and generally includes a positive electrode and a negative electrode, which is capable of occluding and releasing lithium ion, and an electrolyte. As the negative electrode, the negative electrode of this invention described above is used.

The positive electrode is obtained by forming a positive electrode active material layer including a positive electrode active material and a binder on a current collector.

As the positive electrode active material, metal chalcogen compounds, which is capable of occluding and releasing an alkali metal cation such as lithium ion during charging/discharging, and the like are mentioned. As the metal chalcogen compounds, transition metal oxides such as vanadium oxide, molybdenum oxide, manganese oxide, chrome oxide, titanium oxide and tungsten oxide; transition metal sulfides such as vanadium sulfide, molybdenum sulfide, titanium sulfide and CuS; phosphorous-sulfur compounds of a transition metal such as $NiPS_3$ and $FePS_3$; selenium compounds of a transition metal such as $VSe_2$ and $NbSe_3$; complex oxides of a transition metal such as $Fe0.25V0.75S_2$ and $Na0.1CrS_2$; complex sulfides of a transition metal such as $LiCoS_2$ and $LiNiS_2$; and the like are mentioned.

Among them, $V_2O_5$, $V_5O_{13}$, $VO_2$, $Cr_2O_5$, $MnO_2$, $TiO$, $MoV_2O_8$, $LiCoO_2$, $LiNiO_2$, $LiMn_2O_4$, $TiS_2$, $V_2S_5$, $Cr0.25V0.75S_2$, $Cr0.5V0.5S_2$ and the like are preferable, and $LiCoO_2$, $LiNiO_2$ and $LiMn_2O_4$, and complex oxides of lithium transition metal in which a part of these transition metals is substituted with another metal are particularly preferable. Such a positive electrode active material may be used alone or two or more kinds may be mixed and used.

As the binder adhering the positive electrode active material, a known binder can be arbitrarily selected and used. Examples thereof are inorganic compounds such as silicate and liquid glass, and resins having no unsaturated bond such as Teflon (registered trademark) and polyvinylidene fluoride. Among them, resins having no unsaturated bond are preferable. When a resin having an unsaturated bond is used as the resin adhering the positive electrode active material, there is a possibility that the resin is decomposed during the oxidation reaction. The weight-average molecular weight of the resin is within the range of generally 10000 or more and preferably 100000 or more, and generally 3000000 or less and preferably 1000000 or less.

A conductive material may be included in the positive electrode active material layer, in order to improve the conductivity of the electrode. The conductive agent is not particularly limited as long as it can achieve the conductivity by being appropriately mixed with the active material. Generally, carbon powders such as acetylene black, carbon black and graphite, fibers, powders and foils of various metals, and the like are mentioned.

The positive electrode plate is formed by making a slurry from the positive electrode active material and the binder with a solvent, coating the slurry on a current collector and drying it, as in the method for producing the negative electrode described above. As the current collector of the positive electrode, aluminum, nickel, SUS and the like are used, but there is no limitation on it.

As the electrolyte, a nonaqueous electrolytic solution in which lithium salt is dissolved in a nonaqueous solvent, an electrolyte in which the nonaqueous electrolytic solution is made into a gel, a rubber or a solid sheet by an organic polymer compound and the like, or the like are used.

The nonaqueous solvent used for the nonaqueous electrolytic solution is not particularly limited, and a solvent can be appropriately selected and used from known nonaqueous solvents, which have been conventionally proposed as the solvents for a nonaqueous electrolytic solution. Examples thereof are: chain carbonates such as diethyl carbonate, dimethyl carbonate and ethylmethyl carbonate; cyclic carbonates such as ethylene carbonate, propylene carbonate and butylene carbonate; chain ethers such as 1,2-dimethoxyethane; cyclic ethers such as tetrahydrofuran, 2-methyl tetrahydrofuran, sulfolane and 1,3-dioxolan; chain esters such as methyl formate, methyl acetate and methyl propionate; and cyclic esters such as γ-butyrolactone and γ-valerolactone.

One kind of the nonaqueous solvent may be used alone, or two or more kinds thereof may be mixed and used. When it is a mixed solvent, a mixed solvent combination including a cyclic carbonate and a chain carbonate is preferable, and it is particularly preferable that the cyclic carbonate is a mixed solvent of ethylene carbonate and propylene carbonate in view of expressing a high ion conductance at a low temperature and improving the charging load characteristics at a low temperature. Especially, the amount of propylene carbonate is preferably within the range of 2% by mass or more and 80% by mass or less relative to whole the nonaqueous solvent, more preferably within the range of 5% by mass or more and 70% by mass or less, and further preferably within the range of 10% by mass or more and 60% by mass or less. When the ratio of propylene carbonate is lower than the above, the ion conductance at a low temperature decreases. If the ratio of propylene carbonate is higher than the above, when a graphite electrode is used, deterioration of the delamination of the graphite negative electrode active material occurs due to the cointegration of the PC solvated in Li ion to the graphite interphase, and there is a problem in that a sufficient capacity cannot be obtained.

The lithium salt used for the nonaqueous electrolytic solution is not particularly limited, and the lithium salt can be appropriately selected and used from lithium salts known to be usable in this application. Examples thereof are: inorganic lithium salts including; halides such as LiCl and LiBr; salts of perhalogen acid such as $LiClO_4$, $LiBrO_4$ and $LiClO_4$; inorganic lithium salts such as $LiPF_6$, $LiBF_4$ and $LiAsF_6$: and fluorine-containing organic lithium salts including; perfluoroalkanesulfonates such as $LiCF_3SO_3$ and $LiC_4F_9SO_3$; and perfluoroalkanesulfonic imide such as Li trifluorosulfonic imide $((CF_3SO_2)_2NLi)$. Among them $LiClO_4$, $LiPF_6$ and $LiBF_4$ are preferable.

The lithium salt may be used alone, or two or more kinds may be mixed and used. The concentration of the lithium salt in the nonaqueous electrolytic solution is generally within the range of 0.5M or more and 2.0M or less.

Furthermore, when an organic polymer compound is contained in the nonaqueous electrolytic solution described above and it is used in a gel form, a rubber form or a solid sheet form, specific examples of the organic polymer compound are: polyether polymer compounds such as polyethylene oxide and polypropylene oxide; cross-linked polymers of polyether polymer compounds; vinylalcohol polymer compounds such as polyvinylalcohol and polyvinylbutyral; insolubilized compounds of vinylalcohol polymer compounds; polyepichlorohydrin; polyphosphazene; polysiloxane; vinyl polymer compounds such as polyvinylpyrrolidone, polyvinylidene carbonate and polyacrylonitrile; and polymer copolymers such as poly(ω-methoxyoligooxyethylene methacrylate), poly(ω-methoxyoligooxyethylene methacrylate-co-methylmethacrylate) and poly(hexafluoropropylene-vinylidene fluoride).

The nonaqueous electrolytic solution above may further include a film-forming agent. Specific examples of the film-forming agent are: carbonate compounds such as vinylene carbonate, vinylethyl carbonate and methylphenyl carbonate; alkene sulfide such as ethylene sulfide and propylene sulfide; sultone compounds such as 1,3-propane sultone and 1,4-butane sultone; and acid anhydrides such as maleic anhydride and succinic anhydride. Further, an anti-overcharge agent such as diphenyl ether and cyclohexyl benzene may be added. When the above additives are used, the amount thereof is within the range of generally 10% by mass or less, particularly 8% by mass or less, further preferably 5% by mass or less and particularly preferably 2% by mass or less. When the amount of the above additives is too high, there is a possibility that other battery characteristics are negatively affected, for example, the initial irreversible capacity increases, or the low-temperature characteristics and the rate characteristics deteriorate.

Further, it is also possible to use a polymer solid electrolyte which is a conductive body of an alkali metal cation such as lithium ion as the electrolyte. As the polymer solid electrolyte, an electrolyte obtained by dissolving a salt of Li in the polyether polymer compound described above, or a polymer in which the terminal hydroxyl group of the polyether is substituted with alkoxide are mentioned.

Between the positive electrode and the negative electrode, a porous separator such as a porous membrane or an unwoven fabric is generally provided to prevent short-circuit between the electrodes. In this case, the nonaqueous electrolytic solution is used by impregnating the porous separator. As the material for the separator, polyolefins such as polyethylene and polypropylene, polyether sulfone and the like are used, and polyolefins are preferable.

The form of the lithium ion secondary battery of this invention is not particularly limited. Examples thereof are cylinder-type in which sheet electrodes and the separator are provided in a spiral, cylinder-type with an inside-out structure in which pellet electrodes and the separator are combined, coin-type in which pellet electrodes and the separator are laminated, and the like. Further, by placing the battery in such a form in any outer case, the battery can be used in any form such as coin-type, cylinder-type and square-type.

The procedure for assembling the lithium ion secondary battery of this invention is not particularly limited, and the battery can be assembled with an appropriate procedure in accordance with the battery structure. For example, the negative electrode is placed in the outer case, the electrolytic solution and the separator are provided thereon, the positive electrode is placed thereon facing to the negative electrode, and the battery is produced by swaging with a gasket and a sealing plate.

<Battery Performance>

The battery produced as described above shows the following performance.

The irreversible capacity is generally 50 mAh/g or less, preferably 40 mAh/g or less, more preferably 35 mAh/g or less and further preferably 30 mAh/g or less. The charging load characteristic is generally 20% or more, preferably 30% or more, more preferably 40% or more and further preferably 50% or more. The discharging load characteristic is generally 55% or more, preferably 60% or more, more preferably 70% or more and further preferably 75% or more.

EXAMPLES

Next, specific embodiments of this invention are explained further in detail by Examples, but this invention is not limited by these examples.

(Measurement Method)
(1) Surface Functional Group Amounts

The surface functional group amounts are measured using X-ray photoelectron spectroscopy (XPS).

N/C (%)

As the X-ray photoelectron spectroscopy measurement, an X-ray photoelectron spectrometer (ESCA manufactured by Ulvac-Phi, Inc) is used, the object to be measured (graphite material) is placed on a sample stage with the surface flat, and the spectra of C1s (280 to 300 eV) and N1s (390 to 410 eV) are measured using Kα-ray of aluminum as the X-ray source and by the multiplex measurement. The peak areas of the spectra of C1s and N1s are determined and then multiplied by an apparatus sensitivity coefficient to calculate the surface atom concentrations of C and N, respectively. Using these surface atom concentrations of N and C obtained, the N/C was calculated by the formula 11.

N/C (%)=[N atom concentration calculated based on peak area of N1s spectrum in X-ray photoelectron spectroscopy (XPS) analysis/C atom concentration calculated based on peak area of C1s spectrum in XPS analysis]×100    Formula 11:

S/C (%)

As the X-ray photoelectron spectroscopy measurement, an X-ray photoelectron spectrometer (ESCA manufactured by Ulvac-Phi, Inc) is used, the object to be measured (graphite material) is placed on a sample stage with the surface flat, and the spectrum of C1s (280 to 300 eV) and the spectrum of S2p (160 to 175 eV) are measured using Kα-ray of aluminum as the X-ray source and by the multiplex measurement. The peak area of the spectrum of C1s and the peak area of the spectrum corresponding to S2p in the range of 160 to 175 eV are determined and then multiplied by an apparatus sensitivity coefficient to calculate the surface atom concentrations of C and S, respectively. Using these surface atom concentrations of S and C obtained, the S/C was calculated by the formula 12.

S/C (%)=[S atom concentration calculated based on peak area of S2s spectrum in X-ray photoelectron spectroscopy (XPS) analysis/C atom concentration calculated based on peak area of C1s spectrum in XPS analysis]×100      Formula 12:

O/C (%)

As the X-ray photoelectron spectroscopy measurement, an X-ray photoelectron spectrometer (ESCA manufactured by Ulvac-Phi, Inc) is used, the object to be measured (graphite material) is placed on a sample stage with the surface flat, and the spectra of C1s (280 to 300 eV) and O1s (525 to 545 eV) are measured using Kα-ray of aluminum as the X-ray source and by the multiplex measurement. After charge correction by setting the obtained peak top of C1s at 284.3 eV, the peak areas of the spectra of C1s and O1s are determined and then multiplied by an apparatus sensitivity coefficient to calculate the surface atom concentrations of C and O, respectively. Using these surface atom concentrations of O and C obtained, the O/C was calculated by the formula 13.

O/C (%)=[O atom concentration calculated based on peak area of O1s spectrum in X-ray photoelectron spectroscopy (XPS) analysis/C atom concentration calculated based on peak area of C1s spectrum in XPS analysis]×100      Formula 13

N/O (%)

By the method similar to the method above, the spectra of O1s (525 to 545 eV) and N1s (390 to 410 eV) are measured, and the peak areas of the spectra of O1s and N1s are determined and then multiplied by an apparatus sensitivity coefficient to calculate the surface atom concentrations of O and N, respectively. Using these surface atom concentrations of N and O obtained, the N/O was calculated by the formula 14.

N/O (%)=[N atom concentration calculated based on peak area of N1s spectrum in X-ray photoelectron spectroscopy (XPS) analysis/O atom concentration calculated based on peak area of O1s spectrum in XPS analysis]×100      Formula 14:

S/O (%)

By the method similar to the method above, the spectrum of O1s (525 to 545 eV) and the spectrum of Sp2 (160 to 175 eV) are measured, and the peak area of the spectrum of O1s and the peak area of the spectrum corresponding to S2p in the range of 160 to 175 eV are determined and then multiplied by an apparatus sensitivity coefficient to calculate the surface atom concentrations of O and S, respectively. Using these surface atom concentrations of S and O obtained, the S/O was calculated by the formula 15.

S/O (%)=[S atom concentration calculated based on peak area of S2s spectrum in X-ray photoelectron spectroscopy (XPS) analysis/O atom concentration calculated based on peak area of O1s spectrum in XPS analysis]×100      Formula 15:

(2) Particle Diameter

Regarding the method for measuring the particle diameter, 0.01 g of a carbon material is suspended in 10 mL of a 0.2% by mass aqueous solution of polyoxyethylene sorbitan monolaurate (for example, Tween 20 (registered trademark)) as a surfactant, the suspension is introduced to a commercially available laser diffraction/scattering-type particle size distribution measurement apparatus "LA-920 manufactured by HORIBA" and irradiated with an ultrasonic wave of 28 kHz at an output of 60 W for one minute, and the diameter measured as the volume-based median size in the measurement apparatus is defined as the d50 in this invention.

(3) BET Specific Surface Area (SA)

Regarding the method for measuring the BET specific surface area, the specific surface area is measured using, for example the specific surface area measurement apparatus "AMS8000" manufactured by Ohkura Riken Co., LTD., according to a nitrogen gas adsorption flow process by a BET one-point method. Specifically, after filling a cell with 0.4 g of the sample (carbon material) and heating it to 350° C. to conduct the pretreatment, it was cooled to the temperature of liquid nitrogen and a gas of 30% nitrogen and 70% He was saturation absorbed. Then, it was heated to room temperature, the desorbed gas amount was measured, and the specific surface area was calculated from the obtained results by the normal BET method.

(4) X-Ray Structural Analysis (XRD)

Regarding the measurement method for the X-ray structural analysis (XRD), a carbon material is filled in a 0.2 mm sample plate while the orientation is prevented, and measured with an X-ray diffraction apparatus (for example, JDX-3500 manufactured by JEOL Ltd.) with CuKα-ray at an output of 30 kV and 200 mA. After the background is subtracted from the obtained two peaks of 3R(101) at around 43.4° and 2H(101) at around 44.5°, the intensity ratio 3R(101)/2H(101) is calculated.

(5) Tap Density

As for the tap density, using "tap denser KYT-4000" manufactured by Seishin Enterprise Co., Ltd., which is a powder density meter, a carbon material is dropped in a cylindrical tap cell having a diameter of 1.6 cm and a volume capacity of 20 cm$^3$ through a sieve having a sieve opening of 300 μm to fill up the cell, tapping with a stroke length of 10 mm is then performed 1000 times, and the density determined from the volume and the weight of the sample is defined as the tap density.

(6) Raman Spectrum (Raman) Spectrum

The Raman spectrum can be measured with a Raman spectrometer; "Raman spectrometer manufactured by JASCO Corporation. Specifically, the sample is filled by letting the particles to be measured freely fall in the measurement cell, and the measurement is performed while the measurement cell is irradiated with an argon ion laser light and while the measurement cell is rotated in the plane perpendicular to this laser light.

Wavelength of argon ion laser light: 514.5 nm

Laser power on sample: 25 mW

Resolution: 4 cm$^{-1}$

Measurement range: 1100 cm$^{-1}$ to 1730 cm$^{-1}$

Measurement of peak intensity, measurement of peak half value width: Background processing, smoothing processing (convolution by simple average of 5 points)

(7) Methods of Irreversible Capacity Measurement, Charging Load Characteristics Test and Discharging Load Characteristics Test Using a nonaqueous secondary battery, the irreversible capacity and the discharging capacity during battery charging/discharging were measured by the following measurement methods.

After charging with a current density of 0.16 mA/cm$^2$ to 5 mV relative to the lithium counter electrode, further charging with a constant voltage of 5 mV until the charging capacity value became 350 mAh/g and doping lithium in the negative electrode, discharging was conducted to 1.5 V relative to the lithium counter electrode with a current density of 0.33 mA/cm$^2$. Continuously, for the second and third times, charging was conducted at 10 mV and 0.005 Ccut by cc-cv charging with the same current density, and the discharging was conducted at 0.04 C to 1.5 V for all the times. The sum of the differences of the charging capacity and the discharging capacity of the three cycles was calculated as the irreversible capacity. Furthermore, the discharging capacity of the third cycle was regarded as the discharging capacity of the material, and the discharging capacity of the third cycle/(the discharging capacity of the third cycle+the sum of the differences of the charging capacity and the discharging capacity of the three cycles) was regarded as the initial efficiency.

Regarding the test for the charging load characteristics, after conducting the normal charging/discharging test for three cycles, the capacity until the potential difference between the electrodes reached 0 V vs. Li was measured by cc charging under a condition of the charging current of 0.04 C (0.16 mA/cm$^2$) and 0.5 C (2.0 mA/cm$^2$), and the capacity was represented by [0.5 C (2.0 mA/cm$^2$)]/[0.04 C (0.16 mA/cm$^2$)]×100(%). Regarding the test for the discharging load characteristics, after conducting the normal charging/discharging test for three cycles, the capacity until the potential difference between the electrodes reached 1.5 V vs. Li was measured by cc discharging under a condition of the discharging current of 0.2 C (0.8 mA/cm$^2$) and 2.0 C (8.0 mA/cm$^2$), and the capacity was represented by [2.0 C (8.0 mA/cm$^2$)]/[0.2 C (0.8 mA/cm$^2$)]×100(%).

(Preparation of Electrode Sheet)

Using the carbon material of this invention as the negative electrode material, a polar plate having an active material layer with an active material layer density of 1.70±0.03 g/cm$^3$ was prepared. Specifically, 20.00±0.02 g (0.200 g in the solid content conversion) of 1% by mass aqueous carboxymethyl cellulose sodium salt solution and 0.50±0.05 g (0.2 g in the solid content conversion) of styrene-butadiene rubber aqueous dispersion having a weight-average molecular weight of 270000 were stirred in 20.00±0.02 g of the negative electrode material for 5 minutes with a hybrid mixer manufactured by Keyence Corporation, and a slurry was obtained after defoaming for 30 seconds.

This slurry was coated with the width of 5 cm using a doctor blade on copper foil with a thickness of 18 μm as the current collector, so that 14.5±0.3 mg/cm$^2$ of the negative electrode material was adhered, and air-drying was conducted at room temperature. After drying for further 30 minutes at 110° C., it was roll pressed using a roller with a diameter of 20 cm, and an electrode sheet was obtained by adjusting the density of the active material layer to 1.70±0.03 g/cm$^3$.

(Preparation of Nonaqueous Secondary Battery (2016 Coin-Type Battery)

The electrode sheet prepared by the above method was cut into a disk having a diameter of 12.5 mm, and lithium metal foil was cut into a disk having a diameter of 14 mm and used as the counter electrode. Between the electrodes, a separator (manufactured by porous polyethylene film) was placed, in which the separator was impregnated with A: an electrolytic solution obtained by dissolving LiPF$_6$ to a mixed solvent of ethylene carbonate and ethylmethyl carbonate (volume ratio=3:7) so that the concentration of LiPF$_6$ became 1 mol/L, B: an electrolytic solution obtained by dissolving LiPF$_6$ to a mixed solvent of ethylene carbonate, propylene carbonate and diethyl carbonate (volume ratio=2:4:4) so that the concentration of LiPF$_6$ became 1 mol/L, or C: an electrolytic solution obtained by dissolving LiPF$_6$ to a mixed solvent of ethylene carbonate, propylene carbonate and diethyl carbonate (volume ratio=1:5:4) so that the concentration of LiPF$_6$ became 1 mol/L. Thus, 2016 coin-type batteries using the electrolytic solutions A to C were each prepared.

(Kind of Raw Material)

(1) Graphite Particles

In the Examples, the following natural graphite materials are used as the graphite particles.

Graphite Particles (a): Spherical natural graphite particles, in which the particle diameter d50, the tap density, the specific surface area and the Raman R value measured by the above measurement methods are 21 μm, 0.91 g/cm$^3$, 4.6 m$^2$/g and 0.20, respectively.

Graphite Particles (b): Spherical natural graphite, in which the particle diameter d50, the tap density, the specific surface area and the Raman R value measured by the above measurement methods are 25 μm, 1.05 g/cm$^3$, 4.3 m$^2$/g and 0.22, respectively.

(2) Organic Compound

The following materials are used as the organic compound in the Examples.

Coal-Tar Pitch (a): Coal-tar pitch, in which; the quinoline insoluble component is 7% by mass; the toluene insoluble component is 30% by mass; the H/C is 0.04; the remaining carbon ratio is 25% by mass; the spacing of the 002 plane (d002) by X-ray wide-angle diffraction of a carbon powder, which is obtained by pulverization treatment for 30 seconds under the atmosphere with a rapid oscillation-type sample mill manufactured by CNT (TI-100 type) after calcination at 1000° C., is 0.3467 nm; the Lc (004) is 17 nm; and the O/C, the N/C, the S/C and the N/C+S/C measured by X-ray photoelectron spectroscopy analysis are 4.86, 0.42, 0.08 and 0.51, respectively.

Petroleum-Type Heavy Oil (b): Petroleum-type heavy oil in which; the quinoline insoluble component_0.5% by mass; the toluene insoluble component is 15% by mass; the H/C is 0.07; the remaining carbon ratio is 15% by mass; the spacing of the 002 plane (d002) by X-ray wide-angle diffraction of a carbon powder, which is obtained by pulverization treatment for 30 seconds under the atmosphere with a rapid oscillation-type sample mill manufactured by CNT (TI-100 type) after calcination at 1000° C., is 0.3454 nm; the Lc (004) is 22 nm; and the O/C, the N/C, the S/C and the N/C+S/C measured by X-ray photoelectron spectroscopy analysis are 4.05, 0.26, <0.01 and 0.26, respectively.

Here, a sample obtained by calcining the coal-tar pitch (a) and the petroleum-type heavy oil (b) at 1000° C. is hard because the crystallinity is low, and it is necessary to conduct relatively high pulverization treatment in order to obtain a powder sample for analysis. Accordingly, it is oxidized by oxygen in the air, and thus the O/C measured by X-ray photoelectron spectroscopy analysis tends to be higher than those of Examples 1 and 2 below.

Example 1

A carbon material having a multilayer structure, in which the surface of the graphite particles was covered with amorphous carbon, was obtained by mixing the graphite particles (a) and the coal-tar pitch (a), heat-treating the mixture at 1300° C. in an inert gas and conducting pulverization/classification treatment to the calcined product obtained. From the calcination yield, it was confirmed that the carbon material having a multilayer structure obtained was covered with the amorphous carbon in an amount of 3 parts by weight relative to the weight parts of the graphite.

Regarding this sample, the particle diameter d50, the tap density, the specific surface area, the Raman R value, the O/C, the N/C, the S/C, the N/C+S/C, the N/O and the S/O were measured and calculated by the above measurement methods. The results are shown in Table 1. Further, in accordance with the above measurement methods, the irreversible capacity, the discharging capacity, the initial efficiency, and the discharging load characteristics were measured. The results are shown in Table 2.

Comparative Example 1

Except that the petroleum-type heavy oil (b) was used instead of the coal-tar pitch (a), the same procedure was conducted as in Example 1, and a carbon material having a multilayer structure was obtained. The physical properties and the battery characteristics of this material were measured in the same methods as those in Example 1. The results are shown in Table 1 and Table 2.

Comparative Example 2

The physical properties and the battery characteristics of the graphite particles (a) were measured in the same methods as those in Example 1. The results are shown in Table 1 and Table 2.

Comparative Example 3

After stirring the graphite particles (a) in concentrated sulfuric acid for four hours, the graphite particles were washed with purified water and kept at 300° C. for six hours. The physical properties and the battery characteristics of the graphite particles, which were obtained by heat-treating the sample obtained here at 1000° C. in an inert gas, were measured in the same methods as those in Example 1. The results are shown in Table 1 and Table 2.

Comparative Example 4

After heat-treating the graphite particles (a) at 3000° C. in an inert gas, the physical properties and the battery characteristics were measured in the same methods as those in Example 1. The results are shown in Table 1 and Table 2.

Example 2

Except that the graphite particles (b) were used instead of the graphite particles (a), the same procedure was conducted as in Example 1, and a carbon material having a multilayer structure was obtained. The physical properties and the battery characteristics of this material were measured in the same methods as those in Example 1. The results are shown in Table 1 and Table 2.

Comparative Example 5

Except that the petroleum-type heavy oil (b) was used instead of the coal-tar pitch (a), the same procedure was conducted as in Example 2, and a carbon material having a multilayer structure was obtained. The physical properties and the battery characteristics of this material were measured in the same methods as those in Example 1. The results are shown in Table 1 and Table 2.

TABLE 1

| | d50, μm | SA, m²/g | Tap density, g/cm³ | Raman R value | O/C, atm % | N/C, atm % | S/C, atm % | N/C + S/C, atm % | N/O, atm % | S/O, atm % |
|---|---|---|---|---|---|---|---|---|---|---|
| Example 1 | 20 | 2.7 | 1.05 | 0.29 | 0.69 | 0.34 | 0.10 | 0.44 | 50 | 15 |
| Comparative Example 1 | 20 | 2.6 | 1.06 | 0.31 | 0.86 | 0.25 | 0.04 | 0.29 | 29 | 5 |
| Comparative Example 2 | 21 | 4.6 | 0.91 | 0.20 | 1.99 | 0.32 | 0.04 | 0.36 | 16 | 2 |
| Comparative Example 3 | 21 | 4.9 | 0.99 | 0.26 | 0.78 | <0.01 | 0.18 | 0.18 | — | 23 |
| Comparative Example 4 | 21 | 3.7 | 0.98 | 0.04 | 0.28 | <0.01 | <0.01 | <0.05 | — | — |
| Example 2 | 24 | 2.6 | 1.11 | 0.31 | 0.94 | 0.49 | 0.10 | 0.59 | 52 | 11 |
| Comparative Example 5 | 24 | 2.5 | 1.12 | 0.32 | 0.96 | 0.19 | <0.01 | 0.19 | 20 | — |

TABLE 2

| | Battery Data | | | | |
|---|---|---|---|---|---|
| | Irreversible Capacity, mAh/g | Discharging Capacity, mAh/g | Initial Efficiency, % | Charging Load Characteristics, % | Discharging Load Characteristics, % |
| Example 1 | 27 | 364 | 93 | 50 | 79 |
| Comparative Example 1 | 27 | 365 | 93 | 46 | 71 |
| Comparative Example 2 | 27 | 367 | 93 | 30 | 68 |

TABLE 2-continued

| | Battery Data | | | | |
|---|---|---|---|---|---|
| | Irreversible Capacity, mAh/g | Discharging Capacity, mAh/g | Initial Efficiency, % | Charging Load Characteristics, % | Discharging Load Characteristics, % |
| Comparative Example 3 | 24 | 367 | 94 | 39 | 70 |
| Comparative Example 4 | 21 | 368 | 95 | 27 | 67 |
| Example 2 | 25 | 365 | 94 | | 61 |
| Comparative Example 5 | 24 | 366 | 94 | | 55 |

From the above results, by using the carbon materials, in which nitrogen element and sulfur element were included in specific amounts in the negative electrode materials, as in Example 1, the effect for improving the charging load characteristics and the discharging load characteristics while maintaining a high charging/discharging efficiency in the initial cycle was clearly observed, in comparison with Comparative Examples 1 to 4 which used the carbon materials, in which nitrogen element and sulfur element were not included in specific amounts in the negative electrode materials. Similarly, the similar effect was clearly observed in Example 2 in comparison with Comparative Example 5.

Although this invention has been explained in detail and in reference to specific embodiments, it is obvious to one skilled in the art that various changes and modifications can be added without departing from the spirit and the scope of this invention. This application is based on the Japanese patent application filed on May 13, 2011 (JP2011-108457), and the contents thereof are incorporated herewith as a reference.

INDUSTRIAL APPLICABILITY

By using the carbon material of this invention as the carbon material for a nonaqueous secondary battery, a negative electrode material for a nonaqueous secondary battery having a high capacity and excellent charging/discharging load characteristics can be provided.

The invention claimed is:

1. A carbon material for a nonaqueous secondary battery, which satisfies the following conditions (1) to (3):
    (1) the Raman R value represented by the following formula 1 is from 0.01 to 1:

Raman $R$ value=Intensity $I_B$ of peak $P_B$ at 1360 cm$^{-1}$ in Raman spectrum analysis/Intensity $I_A$ of peak $P_A$ at 1580 cm$^{-1}$ in Raman spectrum analysis;

(2) the N/C represented by the following formula 2 is from 0.05% to 2%:

N/C (%)=[N atom concentration calculated based on peak area of N1s spectrum in X-ray photoelectron spectroscopy analysis/C atom concentration calculated based on peak area of C1s spectrum in X-ray photoelectron spectroscopy analysis]×100;

and
    (3) the S/C represented by the following formula 3 is from 0.05% to 2%:

S/C (%)=[S atom concentration calculated based on peak area of S2s spectrum in X-ray photoelectron spectroscopy analysis/C atom concentration calculated based on peak area of C1s spectrum in X-ray photoelectron spectroscopy analysis]×100.

2. The carbon material of claim 1, wherein the carbon material has a multilayer structure and comprises graphite particles covered with amorphous carbon.

3. The carbon material of claim 2, wherein the graphite particles comprise natural graphite.

4. The carbon material of claim 2, wherein the Raman R value represented by the following formula 1 of the graphite particles is from 0.05 to 1.

5. The carbon material of claim 2, wherein the tap density of the graphite particles is from 0.7 g/cm$^3$ to 1.20 g/cm$^3$.

6. A method for producing complex graphite particles (C) for a nonaqueous secondary battery, the method comprising:
    mixing graphite particles (A) and an organic compound (B); and
    carbonizing the organic compound (B),
    wherein an amount of a quinoline insoluble component in the organic compound (B) is 1% by mass or more
    wherein a carbon powder obtained by calcining and carbonizing the organic compound (B) at 1000° C. and then pulverizing for 30 seconds in the atmosphere with a rapid oscillation-type sample mill, satisfies the following conditions (I) to (IV);
    (I) the N/C represented by the following formula 2 is from 0.27% to 2%

N/C (%)=[N atom concentration calculated based on peak area of N1s spectrum in X-ray photoelectron spectroscopy analysis/C atom concentration calculated based on peak area of C1s spectrum in X-ray photoelectron spectroscopy analysis]×100, (II) the S/C represented by the following formula 3 is 0.02% or more and 2% or less, S/C (%)=[S atom concentration calculated based on peak area of S2s spectrum in X-ray photoelectron spectroscopy analysis/C atom concentration calculated based on peak area of C1s spectrum in X-ray photoelectron spectroscopy analysis]×100,     Formula 3:

(III) the spacing of the 002 plane (d002) by X-ray wide-angle diffraction is from 0.345 nm to 0.36 nm, and
    (IV) the crystallite size Lc (004) is from 0.1 nm to 20 nm.

7. The method of claim 6, wherein an amount of a toluene insoluble component in the organic compound (B) is 16% by mass or more.

8. A carbon material for a nonaqueous secondary battery, which comprises the complex graphite particles (C) for a nonaqueous secondary battery obtained by the production method as described in claim 6.

9. A negative electrode for a nonaqueous secondary battery, which comprises a current collector and an active material layer formed on the current collector, wherein the active material layer includes the carbon material for a nonaqueous secondary battery described in claim 1.

10. A lithium ion secondary battery which comprises: a positive electrode and a negative electrode capable of occluding and releasing lithium ion; and an electrolyte, wherein the negative electrode is the negative electrode for a nonaqueous secondary battery as described in claim 9.

11. A carbon material for a nonaqueous secondary battery, which satisfies the following conditions (1) to (3):

(1) the Raman R value represented by the following formula 1 is from 0.01 to:

$$\text{Raman } R \text{ value} = \text{Intensity } I_B \text{ of peak } P_B \text{ at } 1360 \text{ cm}^{-1} \text{ in Raman spectrum analysis/Intensity } I_A \text{ of peak } P_A \text{ at } 1580 \text{ cm}^{-1} \text{ in Raman spectrum analysis;}$$

(2) the N/C represented by the following formula 2 is from 0.05% to 2%:

$$\text{N/C (\%)} = [\text{N atom concentration calculated based on peak area of N1s spectrum in X-ray photoelectron spectroscopy analysis/C atom concentration calculated based on peak area of C1s spectrum in X-ray photoelectron spectroscopy analysis}] \times 100;$$

and (3) the S/C represented by the following formula 3 is from 0.05% to 2%:

$$\text{S/C (\%)} = [\text{S atom concentration calculated based on peak area of S2s spectrum in X-ray photoelectron spectroscopy analysis/C atom concentration calculated based on peak area of C1s spectrum in X-ray photoelectron spectroscopy analysis}] \times 100,$$

wherein the carbon material is obtained by the method comprising:

mixing graphite particles (A) and an organic compound (B); and carbonizing the organic compound (B), wherein an amount of a quinoline insoluble component in the organic compound (B) is 1% by mass or more.

* * * * *